US009203817B2

(12) United States Patent
Tsujimoto

(10) Patent No.: US 9,203,817 B2
(45) Date of Patent: Dec. 1, 2015

(54) MULTIFUNCTION APPARATUS AND MULTIFUNCTION APPARATUS CONTROL SYSTEM

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1283 days.

(21) Appl. No.: 13/072,833

(22) Filed: Mar. 28, 2011

(65) Prior Publication Data

US 2011/0239123 A1 Sep. 29, 2011

(30) Foreign Application Priority Data

Mar. 29, 2010 (JP) ................................ 2010-075135

(51) Int. Cl.

*G06F 15/16* (2006.01)
*H04L 29/06* (2006.01)
*H04N 1/00* (2006.01)
*H04L 29/08* (2006.01)

(52) U.S. Cl.

CPC ................ *H04L 63/08* (2013.01); *H04L 67/02* (2013.01); *H04L 67/142* (2013.01); *H04N 1/0023* (2013.01); *H04N 1/00233* (2013.01); *H04N 1/00464* (2013.01); *H04N 2201/0094* (2013.01)

(58) Field of Classification Search

CPC .................. H04N 2201/0094; H04N 21/8173; H04L 67/02; H04L 41/0803
USPC ......................................... 709/203; 358/1.15
See application file for complete search history.

(56) References Cited

U.S. PATENT DOCUMENTS 5,875,296 A 2/1999 Shi et al.
7,814,236 B2 10/2010 Tsujimoto
2003/0018707 A1* 1/2003 Flocken ........................ 709/203
2003/0101269 A1* 5/2003 Choi ............................ 709/228
2005/0190398 A1* 9/2005 Nuggehalli ........ H04N 1/00212 358/1.15
2006/0262349 A1* 11/2006 Moroi .......................... 358/1.15
2009/0262381 A1 10/2009 Tsujimoto
2009/0292708 A1* 11/2009 Sato ................... H04N 1/00222
2009/0310167 A1* 12/2009 Sugimoto ............. G06F 3/1208 358/1.15

(Continued)

FOREIGN PATENT DOCUMENTS

JP 10-257048 A 9/1998
JP 2003-323409 A 11/2003

(Continued)

*Primary Examiner* — Duyen Doan
(74) *Attorney, Agent, or Firm* — Keating & Bennett, LLP

(57) ABSTRACT

A multifunction apparatus 21 includes: a web browser section 5; a second web server section 8; and a setting information database 6 for storing Cookie information which is transmitted from a first web server section 53 of an information processing apparatus 51 to the web browser section 5. The web browser section 5 (i) receives, from the first web server section 53, control information for informing the second web server section 8 of a control instruction to control the multifunction apparatus 21, and (ii) informs the second web server section 8 of the control instruction. Then, in a case where the control instruction is an instruction to transmit image data, a control application section 23 and an apparatus control section 7 (i) determine, as specific Cookie information, Cookie information that (a) is stored in the setting information database 6, and (b) contains a domain name of the information processing apparatus 51 which is designated as a destination to which the image data is transmitted, and (ii) transmits the image data, to which the specific Cookie information is added, to the information processing apparatus 51.

18 Claims, 7 Drawing Sheets

(56) References Cited

U.S. PATENT DOCUMENTS

| | | | | |
|---|---|---|---|---|
| 2009/0310170 | A1* | 12/2009 | Murakami | H04N 1/00204 358/1.15 |
| 2010/0063998 | A1 | 3/2010 | Nakamura | |

FOREIGN PATENT DOCUMENTS

| | | | |
|---|---|---|---|
| JP | 2005-182253 | A | 7/2005 |
| JP | 2007-174400 | A | 7/2007 |
| JP | 2010-067016 | A | 3/2010 |

* cited by examiner

```html
<html>
 <body>
  <h2>DOCUMENT MANAGEMENT APPLICATION</h2>
  <form name="Auth" method="post" action="http://123.123.123.123/app/auth">
   <p>LOGIN NAME:<input type="text" name="login_name" size="50"></p>
   <p>PASSWORD:<input type="password" name="password" size="50"></p>
   <input type="submit" value="LOGIN">
   <input type="reset" value="RESET">
  </form>
 </body>
</html>
```

FIG. 6

Set-Cookie: appsession= leisyxineiduyen; expires=01 May 2010 09:10:11 GMT;domain=.example.com;path= /;

FIG. 7

| | | | | |
|---|---|---|---|---|
| .example.com | / | 01 May 2010 09:10:11 GMT | appsession | leisyxineiduyen |
| .example.com | / | 01 May 2010 09:10:20 GMT | appname | docmng |
| .sharp.co.jp | / | 03 May 2010 12:34:56 GMT | uid | sharp1 |

FIG. 8

```
<html>
 <body>
  <h2>DOCUMENT MANAGEMENT APPLICATION</h2>
  <form name="scan" method="post" action="http://127.0.0.1/scan/execscan">
   <p>SET DOCUMENT AND PRESS SCAN BUTTON<p/>
   <br>
   <br>
   <br>
   <div align="right"><input type="submit" value="SCANNING"></div>
  </form>
  <input type='hidden' name="dest" value="http://www.example.com/docmng/receive">
 </body>
</html>
```

FIG. 9

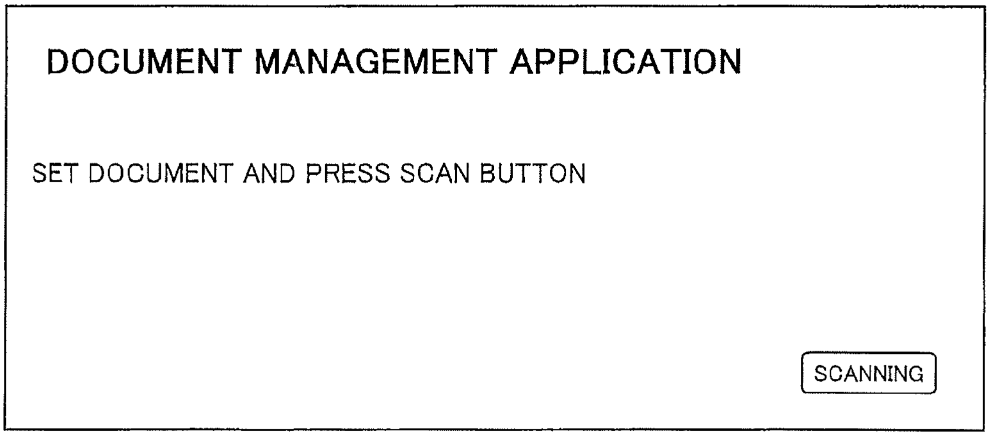

FIG. 10

```
Cookie: appsession=leisyxineiduyen; appname=docmng;
```

MULTIFUNCTION APPARATUS AND MULTIFUNCTION APPARATUS CONTROL SYSTEM

This Nonprovisional application claims priority under 35 U.S.C. §119(a) on Patent Application No. 2010-075135 filed in Japan on Mar. 29, 2010, the entire contents of which are hereby incorporated by reference.

TECHNICAL FIELD

The present invention relates to a multifunction apparatus control system in which a multifunction apparatus and an information processing apparatus work together.

BACKGROUND ART

A web server uses relatively small text data called "HTTP Cookie (hereinafter, referred to as "Cookie information")" for identification of a client which accesses the web server. When a user accesses a website on the web server, the Cookie information is transmitted to a user's web browser, and stored in a hard disk or a memory. In a case where the user inputs a setting or the like while browsing the web site, Cookie information indicating content of such an input is stored. After that, when the user accesses the website via the same web browser again, the Cookie information is automatically transmitted from the web browser to the web server.

This allows the web server to identify the client (web browser) which accesses the web server. The use of the Cookie information makes it possible to provide useful functions such as a function of allowing a user to execute an automatic login process from a user's second access to a destination. In recent years, the Cookie information has been therefore considered as an important function that provides a user with a smooth web access.

Patent Literature 1 discloses a single sign-on system employing the Cookie information, in which (i) a first web server identifies a specific HTTP client and issues Cookie information for the client, and (ii) the user can access, with the use of the Cookie information, not only the first web server but also the second web server.

Further, in recent years, there has been known such a technique that a multifunction apparatus displays an operation screen by use of a web browser on the basis of an HTML document obtained from an external PC. Patent Literature 2 discloses a multifunction apparatus control system including: a multifunction apparatus; and a control apparatus for transmitting a control instruction to the multifunction apparatus via a communication network, for example. In the multifunction apparatus control system, the control device transmits data of the operation screen to the multifunction apparatus by use of the HTTP, and the multifunction apparatus uses a web browser to display the operation screen. Then, the control device transmits a control command to the multifunction apparatus by use of an SOAP in response to an instruction inputted on the operation screen, and the multifunction apparatus executes a function corresponding to the control command.

CITATION LIST

Patent Literature 1

Japanese Patent Application Publication, Tokukai, No. 2003-323409 A (Publication Date: Nov. 14, 2003)

Patent Literature 2

Japanese Patent Application Publication, Tokukai, No. 2007-174400 A (Publication Date: Jul. 5, 2007)

SUMMARY OF INVENTION

Technical Problem

In a case where the multifunction apparatus (i) uses the web browser to display an operation screen, and (ii) transmits, for example, scanned data in accordance with an instruction of software on a web server, the scanned data is not received from the web browser but from another HTTP client (such as a control section) provided in the same multifunction apparatus. For this reason, HTTP communication for transmitting the scanned data cannot be carried out with Cookie information stored in the web browser. This gives rise to such a problem that the software on the web server cannot easily identify whether or not an access from the multifunction apparatus is authorized.

Patent Literature 1 discloses, for example, a technique of allowing a plurality of web servers to share Cookie information of a specific client, but no technique of allowing a plurality of HTTP clients to share Cookie information. Accordingly, the foregoing problem cannot be solved on the basis of the technique disclosed in Patent Literature 1.

The present invention is made in view of the problem. An object of the present invention is to realize a multifunction apparatus which allows a web server to easily determine whether or not an access from the multifunction apparatus to the web server is authenticated, in a case where the multifunction apparatus sends/receives, in accordance with an instruction of software on the web server, data to/from the web server via a different HTTP client provided in the same multifunction apparatus.

Solution to Problem

In order to attain the object, a multifunction apparatus of the present invention, which communicates with an information processing apparatus via a communication network, the information processing apparatus including a first web server section which operates in accordance with software of a web server, includes: a web browser section which operates in accordance with software of a web browser; a second web server section which operates in accordance with the software of the web server; a storage section for storing Cookie information transmitted from the first web server section to the web browser section; and a control section, the web browser section (i) receiving, from the first web server section, control information for informing the second web server section of a control instruction to control the multifunction apparatus, and (ii) informing the second web server section of the control instruction upon reception of the control information from the first web server section, the control section controlling the multifunction apparatus on the basis of the control instruction received by the second web server section, the control section (i) determining, as specific Cookie information, Cookie information that (a) is stored in the storage section, and (b) contains identification information for identifying an external device which is designated, by the instruction to transmit the image data, as a destination to which the image data is transmitted, and (ii) transmitting the image data, to which the specific Cookie information is added, to the external device which is designated as the destination to which the image data is transmitted, in a case where the control instruction is an instruction to transmit image data.

According to the arrangement, the control section can receive the control instruction from the second web server section of the multifunction apparatus, instead of receiving the control instruction from the first web server section of the information processing apparatus. Since the control section and the second web server section are provided in the same multifunction apparatus, no firewall occurs between the control section and the second web server section.

Further, in the case where the control instruction is the instruction to transmit the image data, the control section (i) determines, as the specific Cookie information, the Cookie information that (a) is stored in the storage section, and (b) contains identification information for identifying the external device which is designated, by the instruction to transmit the image data, as the destination to which the image data is transmitted, and (ii) transmits the image data, to which the specific Cookie information is added, to the external device designated as the destination to which the image data is transmitted.

Therefore, in a case where the external device designated as the destination to which the image data is transmitted is the information processing apparatus, the specific Cookie information added to the image data is identical with the Cookie information which is received by the web browser section when the web browser section receives the control information from the first web server section. Accordingly, by checking the specific Cookie information added to the image data, the first web server section of the information processing apparatus can easily determine whether or not the access is authenticated, more specifically, whether or not the image data is transmitted from the authenticated user who has communicated with the first web server section via the web browser section.

Further, in order to attain the object, a multifunction apparatus of the present invention, which communicates with an information processing apparatus via a communication network, the information processing apparatus including a first web server section which operates in accordance with software of a web server, includes: a web browser section which operates in accordance with software of a web browser; a second web server section which operates in accordance with the software of the web server; a storage section for storing Cookie information transmitted from the first web server section to the web browser section; and a control section, the web browser section (i) receiving, from the first web server section, control information for informing the second web server section of a control instruction to control the multifunction apparatus, and (ii) informing the second web server section of the control instruction upon reception of the control information from the first web server section, the control section controlling the multifunction apparatus on the basis of the control instruction transmitted to the second web server section, the control section determining, as specific Cookie information, Cookie information that (a) is stored in the storage section, and (b) contains identification information for identifying an external device which is designated as a data source of image data by the instruction to acquire the image data, and (ii) transmitting a request to transmit the image data, to which request the specific Cookie information is added, to the external device which is designated as the data source of the image data, in a case where the control instruction is an instruction to acquire image data from an external device.

According to the arrangement, in the case where the control instruction is the instruction to acquire the image data from the external device, the control section (i) determines, as the specific Cookie information, the Cookie information that (a) is stored in the storage section, and (b) contains the identification information for identifying the external device which is designated as the data source of the image data by the instruction to acquire the image data, and (ii) transmits the request to transmit the image data, to which request the specific Cookie information is added, to the external device which is designated as the data source of the image data.

Therefore, in a case where the external device which is designated as the data source of the image data is the information processing apparatus, the specific Cookie information added to the request to transmit the image data is identical with the Cookie information received by the web browser section when the web browser section receives the control information from the first web server section. Accordingly, by checking the specific Cookie information added to the request to transmit the image data, the first web server section of the information processing apparatus can easily determine whether or not the access is authenticated, more specifically, whether or not the request is made by the authenticated user who has communicated with the first web server section via the web browser section.

Advantageous Effects of Invention

As described above, according to the multifunction apparatus of the present invention, it is possible to easily determines whether or not an access is authenticated in a case where even a different HTTP client carries out data transmission in accordance with an instruction of software on a web server.

BRIEF DESCRIPTION OF DRAWINGS

FIG. 1 is a block diagram illustrating an arrangement of a multifunction apparatus control system in accordance with an embodiment of the present invention.

FIG. 2 is a flowchart showing how the multifunction apparatus and an information process apparatus work together in a cooperation mode.

FIG. 3 is a view showing a concrete example of the cooperation mode, in a case where scanning is carried out by the multifunction apparatus.

FIG. 4 is a view showing an example of HTML data transmitted in S12 shown in FIG. 3.

FIG. 5 is a view showing an example of a screen corresponding to the HTML data shown in FIG. 4.

FIG. 6

FIG. 6 is a view showing an example of a Set-Cookie header transmitted in S15 shown in FIG. 3.

FIG. 7

FIG. 7 is a view showing an example of a Cookie file transmitted in S15 shown in FIG. 3.

FIG. 8

FIG. 8 is a view showing an example of HTML data transmitted in S15 shown in FIG. 3.

FIG. 9

FIG. 9 is a view showing an example of a screen corresponding to the HTML data shown in FIG. 8.

FIG. 10

FIG. 10 is a view showing an example of a Cookie HTTP header transmitted in S20 shown in FIG. 3.

FIG. 11 is a view illustrating a concrete example of the cooperation mode, in a case where printing is carried out by the multifunction apparatus.

DESCRIPTION OF EMBODIMENTS

One embodiment of the present invention is described below with reference to FIGS. 1 through 11. The present embodiment deals with a multifunction apparatus control system including a multifunction apparatus of the present invention.

[Arrangement of Multifunction Apparatus Control System]

Figure 1:
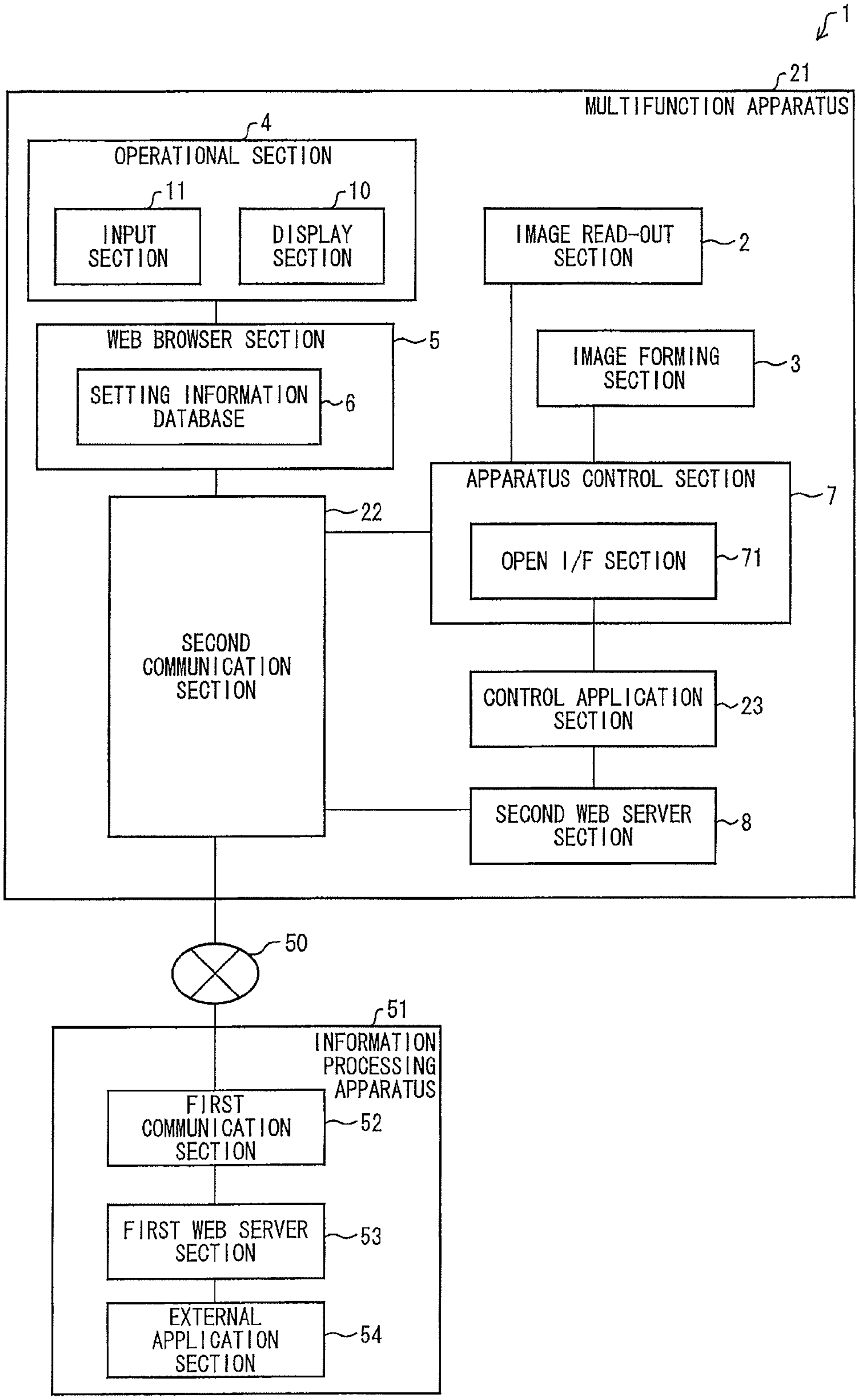
FIG. 1

FIG. 1 is a block diagram illustrating an arrangement of a multifunction apparatus control system 1 in accordance with the present embodiment. The multifunction apparatus control system 1 of the present embodiment includes a multifunction apparatus 21, and an information processing apparatus 51, which communicate with each other via a communication network 50 (see FIG. 1). In the multifunction apparatus control system 1, (i) a plurality of multifunction apparatuses can be provided instead of one multifunction apparatus and (ii) a plurality of information processing apparatuses can be provided instead of one information processing apparatus.

Examples of the communication network 50 via which the multifunction apparatus 21 and the information processing apparatus 51 communicate with each other encompass the Internet, a telephone line, a serial cable, and other wired or wireless networks. The multifunction apparatus 21 and the information processing apparatus 51 communicate with each other by use of an HTTP (Hyper Text Transfer Protocol) which is a protocol used in a communication (e.g. a request for a web page, or transmission of a web page) between a web server and a web browser.

The multifunction apparatus 21 receives HTML (HyperText Markup Language) control information from the information processing apparatus 51 by use of the HTTP. In response to the control information received from the information processing apparatus 51, the multifunction apparatus carries out a function (such as a scanning function, a printing function, or a communicating function).

For example, the multifunction apparatus 21 receives HTML data indicating an operation screen from the information processing apparatus 51, and then causes the operation screen, indicated by the HTML data, to be displayed. The multifunction apparatus 21 carries out various functions in accordance with user's instruction entered via the operation screen.

Alternatively, the multifunction apparatus 21 can carry out a function (e.g. the scanning function, the printing function, or the communicating function), by executing a control command in the control information received from the information processing apparatus 51, which control command is described in a Java (registered trademark) script.

The information processing apparatus 51 is a computer device constituted by (i) an arithmetic processing section such as a CPU or a special purpose processor and (ii) a storage section such as an RAM, a ROM, or an HDD. The information processing apparatus 51 functions as a web server device shared by a plurality of multifunction apparatuses 21. The information processing apparatus 51 includes a first communication section 52, a first web server section 53, and an external application section 54 (see FIG. 1).

The first communication section 52 communicates with the multifunction apparatus 21 via an LAN, the Internet, or the like. The communication is carried out, between the first communication section 52 and the multifunction apparatus 21, by use of an HTTP communication protocol.

The first web server section 53 operates in accordance with software of the web server. Here, the web server is software which provides a function of a server device constituting the WWW (World Wide Web) which is an information system on the Internet. The first web server section 53 has a function of responding (HTTP response) to a request (HTTP request) from the multifunction apparatus 21 via the first communication section 52, by transmitting a file, image data, print data, and/or control information to the multifunction apparatus 21 via the first communication section 52.

The external application section 54 is a block for carrying out an operation, in response to the instruction received from the first web server section 53, in accordance with a predetermined web application. That is, the external application section 54 carries out each operation in accordance with a corresponding one of various web applications which operate on the web server. Such web applications are respective custom applications which are described, for example, in Java (registered trademark) script and operate in a Java (registered trademark) script execution environment provided on the web server.

In a case where, for example, the information processing apparatus 51 receives, from the multifunction apparatus 21, a request for transmission of data of the operation screen, the external application section 54 carries out an operation in accordance with an application for transmission of the operation screen. Specifically, the external application section 54 reads out, from the storage section, the HTML data of the operation screen indicated by the request for the transmission, and transmits the HTML data to the first web server section 53. In this case, if necessary, the external application section 54 adds, to the HTML data of the operation screen, Cookie information for user identification or session management, and then transmits the HTML data with the Cookie information to the first web server section 53.

Further, in a case where, for example, the information processing apparatus 51 receives, from the multifunction apparatus 21, a request for storage of scanned data, the external application section 54 carries out an operation in accordance with an application for scanning. Specifically, the external application section 54 obtains the scanned data which is contained in the request for the storage, and stores the scanned data in a folder which is managed by the external application section 54.

Furthermore, in a case where, for example, the information processing apparatus 51 receives, from the multifunction apparatus 21, a request for transmission of print data, the external application section 54 carries out an operation in accordance with an application for printing. Specifically, the external application section 54 obtains, out of a folder having a folder name indicated by the request for the transmission, the print data having a file name designated by the request for the transmission, and then transmits the print data to the first web server section 53.

According to the present embodiment, in a case where the function (E.g. the scanning function or the printing function) of the multifunction apparatus 21 is controlled, the external application section 54 transmits, to a web browser section 5 of the multifunction apparatus 21, an HTTP response which causes the web browser section 5 to change its access destination to a second web server section 8 of the multifunction apparatus 21. This allows the multifunction apparatus 21 to control various functions in accordance with a control command received from a control application section 23 of the multifunction apparatus 21, not in accordance with the control command received from the information processing apparatus 51 including the external application section 54.

Next, the following description deals with a configuration of the multifunction apparatus 21. The multifunction apparatus 21 can carry out a plurality of functions such as the scanning function, the printing function, a facsimile transmitting and receiving function, and an image data transmitting function. Note that only the main functions (i.e. the scanning function and the printing function) of the functions of the multifunction apparatus 21 will be described below, and descriptions of other functions are omitted in the present specification for convenience.

The multifunction apparatus 21 includes an operational section 4, an image scanning section 2, an image forming section 3, the web browser section 5, a second communication section 22, an apparatus control section (control section) 7, the second web server section 8, and the control application section (control section) 23 (see FIG. 1).

The operational section 4 is a user interface via which (i) the user is provided with information and (ii) the user enters inputs. The operational section 4 includes (i) a display section 10 such as a liquid crystal display and (ii) an input section 11 which includes various input keys. Note that the operational section 4 can be a touch panel in which the display section 10 and the input section 11 are integrally provided.

The image scanning section 2 includes a scanner and a sheet feeding section which feeds a sheet to the scanner. The image scanning section 2 scans, as image data, objects (such as characters and images) which are printed on a document. Note that the image scanning section 2 scans an image so that a scanned image has a predetermined resolution.

The image forming section 3 is provided for printing an image (character/photograph/graphic) on a recording sheet such as paper in accordance with inputted image data. The image forming section 3 includes a photoreceptor drum, a charging device, an exposure device, a developing device, a transfer device, a fixing device, and a sheet tray.

The second communication section 22 is an interface for communicating with an external device such as the information processing apparatus 51. According to the present embodiment, the second communication section 22 communicates with the information processing apparatus 51 by use of the HTTP, as described above. Further, the second communication section 22 can access the second web server section 8 of the multifunction apparatus 21, in a case where an IP address of a multifunction apparatus 21, in which the second communication section 22 is provided, is set as an access destination.

The web browser section 5 operates in accordance with software of the web browser. The web browser section 5 can communicate with, via the second communication section 22, not only the first web server section 53 of the information processing apparatus 51 but also the second web server section 8 provided in the multifunction apparatus 21.

According to the present embodiment, the web browser section 5 communicates with the first web server section 53 of the information processing apparatus 51, in a case where (i) the transmission of the data of the operation screen or the transmission of the print data is requested and (ii) the control command for controlling a function (e.g. the scanning function or the printing function) of the multifunction apparatus 21 is not executed. On the other hand, the web browser section 5 is set to communicate with the second web server section 8 of the multifunction apparatus 21, in a case where the control command for controlling the function of the multifunction apparatus 21 is executed. A concrete example of such setting will be described later in detail.

The web browser section 5 further includes a setting information database (storage section) 6 in which Cookie information is stored. The web browser section 5 stores the Cookie information in the setting information database 6, in a case where the HTTP response, which is received from the information processing apparatus 51, contains the Cookie information.

The second web server section 8 operates in accordance with widely-used software of the web server. The second web server section 8 receives a request (HTTP request) from the web browser section 5, and then transmits a response (HTTP response) to the web browser section 5 by causing the multifunction apparatus 21 to carry out an application for the request.

The control application section 23 carries out a process in accordance with a web application which operates on the web server. The web application is, for example, a custom application described in the Java (registered trademark) script, and operates in the Java (registered trademark) script execution environment provided on the web server.

The control application section 23 (i) creates a control command for controlling a function and transmits the control command to the apparatus control section 7, in a case where the function (e.g. the scanning function or the printing function) of the multifunction apparatus 21 is needed to be controlled. Alternatively, the control application section 23 can control, in accordance with a control command received from the information processing apparatus 51, the web browser section 5 to transmit information inherent in the multifunction apparatus 21 to the first web server section 53. This allows the function of the multifunction apparatus 21 to be controlled.

Further, the control application section 23 obtains the Cookie information stored in the setting information database 6, when the function of the multifunction apparatus 21 is carried out. The control application section 23 creates a control command for adding the Cookie information to the HTTP request to be transmitted, in a case where there is Cookie information which is identical with domain information of the destination of the data transmission.

The apparatus control section 7 controls various functions of the multifunction apparatus 21. Specifically, the apparatus control section 7 controls each operation of the image scanning section 2, the image forming section 3, the second communication section 22, the operational section 4, and the like.

The apparatus control section 7 controls the image scanning section 2 to obtain data of a scanned image, for example. The apparatus control section 7 also controls the image forming section 3 to (i) form, on a sheet, an image indicated by the inputted image data and (ii) eject the sheet. The apparatus control section 7 further (i) stores the inputted image data in a designated external device (e.g. the information processing apparatus 51) via the second communication section 22 or (ii) transmits, to a designated address via the second communication section 22, an e-mail to which the inputted image data is attached.

The apparatus control section 7 has an inherent operation mode and a cooperation mode. According to the inherent operation mode, the apparatus control section 7 (i) controls the display section 10 to display an inherent operation screen which has been stored in the multifunction apparatus 21, (ii) receives, from the input section 11, an instruction entered via the operation screen, and carries out, as described above, the control in accordance with the instruction entered via the operation screen. According to the cooperation mode, the apparatus control section 7 (i) controls the display section 10 to display an operation screen which is received from the information processing apparatus 51 and (ii) carries out, as described above, the control in accordance with an control instruction which is obtained from the control application section 23 in accordance with an instruction entered via the operation screen. Note that a detailed description of the inherent operation mode is omitted here because the inherent operation mode has been commonly employed in a conventional multifunction apparatus.

Upon receipt of an instruction to execute the cooperation mode is inputted, the apparatus control section 7 controls the web browser section 5 to start up and carry out a process in accordance with an URL set in advance (according to the present embodiment, the URL is the one which requests the first web server section 53 of the information processing apparatus 51 to transmit an initial operation screen to the multifunction apparatus 21). In the cooperation mode, the apparatus control section 7 receives a control command from the control application section 23, and carries out the control in accordance with the control command.

The apparatus control section 7 further includes an Open I/F section 71 which can accept a control command irrespective of a type of the multifunction apparatus 21.

The Open I/F section 71 publishes a control command for controlling functions of the multifunction apparatus 21 to the control application section 23. The Open I/F section 71 receives a control command from the control application section 23 and converts the received control command to a command recognizable by the apparatus control section 7. The Open I/F section 71 includes a conversion table storage section (not illustrated) for storing a conversion table in which a control command published to the outside is associated with a command recognizable by the apparatus control section 7. The Open I/F section 71 converts a command based on the conversion table.

As described above, the Open I/F section 71 can accept a commonly-used control command regardless of what type of the multifunction apparatus 21 is employed. Accordingly, it is possible to use a common web application which causes the control application section 23 to operate, regardless of what type of the multifunction apparatus 21 is employed. Therefore, in a case where the control application section 23 is operated in accordance with a new web application, the user only has to install the same web application on each of the plurality of the multifunction apparatuses 21. That is, it is unnecessary to use a corresponding web application for each of the plurality of the multifunction apparatuses 21. It is therefore possible to easily develop the web application for operating the control application section 23.

Note that it is preferable for the multifunction apparatus 21 to be configured so that the web browser section 5 is provided as a member independent of the control application section 23 (see FIG. 1). In a case where, for example, (i) the web browser section 5 and the control application section 23 are provided integrally as a single member and (ii) a version of the web browser section 5 is needed to be upgraded, it is necessary to replace programs of the web browser section 5 and the control application section 23 with respective new programs. This causes a reduction in development efficiency of the multifunction apparatus 21.

In contrast, in a case where the web browser section 5 is provided independent of the control application section 23 as with the multifunction apparatus 21, it is possible to upgrade the version of the web browser section 5 only by replacing the program of the web browser section 5 with a new program. This allows an improvement in development efficiency of the multifunction apparatus 21.

[Process of Multifunction Apparatus Control System]

Figure 2:
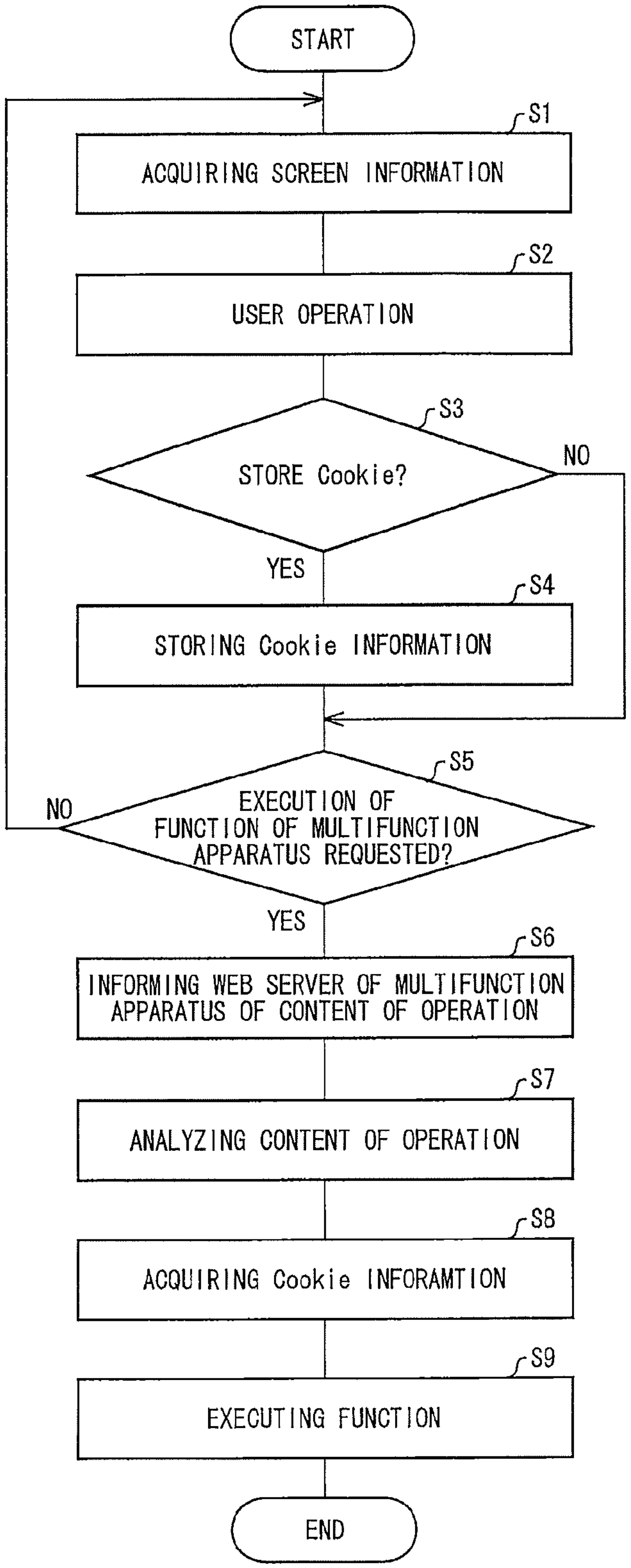
FIG. 2

Next, the following description deals with how the multifunction apparatus 21 and the information processing apparatus 51 work together in the cooperation mode with reference to FIG. 2. FIG. 2 is a flowchart showing how a process proceeds in the cooperation mode.

Initially, when an instruction to start the cooperation mode is entered into the input section 11, the apparatus control section 7 starts the web browser section 5 so that the web browser section 5 accesses a predetermined URL. A URL for requesting the first web server section 53 of the information processing apparatus 51 to transmit an initial operation screen is set in advance. Therefore, the web browser section 5 transmits, to the information processing apparatus 51 via the second communication section 22, a HTTP Get command which requests the transmission of the data of the initial operation screen. In response to the HTTP Get command received from the multifunction apparatus 21, the first web server section 53 of the information processing apparatus 51 sends back, to the multifunction apparatus 21, HTML data of the initial operation screen which corresponds to the HTTP Get command. Then, the web browser section 5 of the multifunction apparatus 21 causes the display section 10 to display the initial operation screen indicated by the HTML data received from the information processing apparatus 51 (S1).

Next, the input section 11 of the multifunction apparatus 21 accepts an instruction which is entered by a user via the displayed initial operation screen (S2).

Then, the web browser section 5 transmits the input to the information processing apparatus 51 via the second communication section 22. In a case where the input entered by the user requires Cookie information to be stored in the web browser section 5 (Yes in S3), the external application section 54 adds the Cookie information to HTML data of an operation screen, and then transmits the HTML data with the Cookie information to the multifunction apparatus 21 via the first communication section 52. Upon the reception of the HTML data of the operation screen with the Cookie information, the web browser section 5 stores the Cookie information in the setting information database 6 (S4).

After that, the processes of S1 through S4 are repeated in a case where the user enters an instruction to (i) request transmission of a next operation screen and (ii) not control any of the functions of the multifunction apparatus (No in S5).

On the other hand, in a case where the user enters an instruction to control any of the functions of the multifunction apparatus 21 (Yes in S5), the second web server section 8 of the multifunction apparatus 21 is informed of such an instruction (S6). According to the present embodiment, the HTTP response, which is transmitted from the information processing apparatus 51 to the multifunction apparatus 21, is arranged so that, in a case where the instruction to control any of the functions of the multifunction apparatus 21 is entered, the second web server section 8 of the multifunction apparatus 21 is informed of such an instruction.

Specifically, the external application section 54 of the information processing apparatus 51 sets, as a loopback address in the HTML data of the operation screen which is to be transmitted to the multifunction apparatus 21, an address of an access destination which address is accessed when a button, which causes a corresponding one of the functions of the multifunction apparatus 21 to be controlled, is pressed on the operation screen. With the arrangement, when the button for causing the corresponding one of the functions to be controlled is pressed on the operation screen, the web browser section 5 of the multifunction apparatus 21 (i) accesses the second web server section 8 of the multifunction apparatus 21 in accordance with the loopback address and (ii) informs the second web server section 8 of the instruction to control the corresponding one of the functions of the multifunction apparatus 21.

Alternatively, the external application section 54 of the information processing apparatus 51 can set the first web server section 53 of the information processing apparatus 51 as the access destination whose address is accessed by the multifunction apparatus 21 when the button for causing the corresponding one of the functions of the multifunction apparatus 21 to be controlled is pressed on the operation screen (which has been transmitted to the multifunction apparatus 21). In this case, upon the reception of the HTTP request indicating that the button for causing the corresponding one of the functions to be controlled was pressed on the operation screen, the external application section 54 transmits, to the web browser section 5 of the multifunction apparatus 21, the HTTP response which changes, by use of HTTP redirect, the access destination which is accessed by the multifunction apparatus 21, to the second web server section 8 of the multifunction apparatus 21. This allows the web browser section 5 to (i) access the second web server section 8 of the multifunction apparatus 21 in accordance with the HTTP response and (ii) inform the second web server section 8 of the instruction to control the function.

Then, the control application section 23, which is started up by the second web server section 8, analyzes the content of a control instruction which has been received from the web browser section 5 (S7).

In a case where the analysis shows that the content of an operation caused by the control instruction is a request for storage of scanned data or a request for carrying out printing (acquisition of print image), the control application section 23 searches for the Cookie information, which is stored in the setting information database 6, so as to obtain a pair of a name and a value of Cookie information which need to be informed to an external device in which the scanned data is to be stored or an external device from which the data of the print image is to be obtained (S8).

Specifically, the control application section 23 obtains, as specific Cookie information which needs to be informed to an external device, Cookie information which (i) is stored in the setting information data base 6 and (ii) contains a domain name (identification information) for identifying the external device in which the scanned data is to be stored or the external device from which the data of the print image is to be obtained. Note that, according to the present embodiment, the information processing apparatus 51 serves as the external device in which the scanned data is to be stored or the external device from which the data of the print image is to be obtained.

Then, the control application section 23 creates, in accordance with an analyzed result, a control command which instructs to (i) add the obtained specific Cookie information to the data to be transmitted and (ii) transmit the control command to the Open I/F section 71. The Open I/F section 71 converts the control command into a command so that the apparatus control section 7 can recognize the command. After that, the apparatus control section 7 controls the various functions in accordance with the converted command (S9). The apparatus control section 7 transmits the data, to which the Cookie information is added, to the information processing apparatus 51 via the second communication section 22, when the HTTP communication for the data transmission is carried out.

As described above, according to the present embodiment, the multifunction apparatus control system 1 includes (i) the information processing apparatus 51 including the first web server section 53 which operates in accordance with the software of the web server and (ii) the multifunction apparatus 21 which communicates with the information processing apparatus 51 via the communication network 50.

The multifunction apparatus 21 includes (i) the web browser section 5 which operates in accordance with the software of the web browser and (ii) the second web server section 8 which operates in accordance with the software of the web server. The web browser section 5 carries out an informing process. In the informing process, the web browser section 5 accepts, from the first web server section 53, the control information for informing the second web server section 8 of the control command for controlling the multifunction apparatus 21, and then informs the second web server section 8 of the control command. The multifunction apparatus 21 includes the control application section 23 and the apparatus control section 7, each of which controls the function of the multifunction apparatus 21 in accordance with the control command, of which the web browser section 5 has informed the second web server section 8.

For example, the web browser section 5 causes the display section 10 to display the operation screen indicated by the image data obtained from the first web server section 53, and then informs the second web server section 8 of the instruction to control the function of the multifunction apparatus 21, which instruction is entered via the operation screen.

Alternatively, the web browser section 5 can (i) receive, from the first web server section 53, control information (control content) in which a control command is described in the Java (registered trademark) script and (ii) inform the second web server section 8 of the control command contained in the control information.

This makes it possible for the control application section 23 and the apparatus control section 7 to receive the control command from the second web server section 8 of the multifunction apparatus 21, instead of receiving the control command from the first web server section 53 of the information processing apparatus 51. Since the control application section 23, the apparatus control section 7, and the second web server section 8 are provided in the same multifunction apparatus 21, no firewall occurs between (i) the second web server section and (ii) the control application section 23 or the apparatus control section 7. Accordingly, the information processing apparatus 51 can control the functions of the multifunction apparatus 21 even if the firewall occurs in the communication network 50 between the multifunction apparatus 21 and the information processing apparatus 51. Further, since the information processing apparatus 51 has the image data of the operation screen, it is possible to easily modify each operation screen, which is displayed by a corresponding one of a plurality of multifunction apparatuses 21, by editing a corresponding image data stored in the information processing apparatus 51.

Further, in a case where the external application section 54, which executes an application for scanning (scanning application) or an application for printing, carries out an availability control in which such an application is available for only a user who succeeds in a log-in process after the external application section 54 carries out authentication with respect to the user who tries to use such an application. Whether or not the user is in a log-in state is managed by use of a session (session management). According to the session management, a session ID, issued by the external application section 54 which executes the scanning application or the printing application, is stored, as Cookie information, in the web browser section 5, and then it is secured that the user's access is an authenticated one, based on the recognition that the user is in a log-in state in a case where the Cookie information, i.e., an appropriate session ID, is contained in the next request. In a case where (i) the application employing such strict security management receives, from the multifunction apparatus 21, a request for transmission of the scanned data or a request for acquisition of the print data and (ii) such a request does not contain the Cookie information (i.e. the appropriate session ID), the external application section 54 cannot judge whether the request is made by authenticated means or the request is an attack made by an unauthenticated access.

In view of the circumstances, according to the multifunction apparatus control system 1 of the present embodiment, in a case where the Cookie information is stored in the web browser section 5, the control application section 23 (i) obtains the Cookie information and (ii) judges whether or not the transmission condition of the Cookie information is identical with that contained in the request. In a case where there is corresponding information (specific Cookie information), the specific Cookie information is added to the HTTP request for the transmission of the scanned data or the HTTP request for the acquisition of the print data.

In other words, upon the reception of the instruction to transmit the scanned data, the control application section 23 transmits the scanned data, to which specific information is added, to the external application section 54 of the information processing apparatus 51. Such specific information is Cookie information that (i) is stored in the setting information data base 6 and (ii) contains a domain name for identifying the external device (in this case, the information processing apparatus 51) that is designated by the instruction to transmit the scanned data.

Further, upon the reception of the instruction to acquire the print data, the control application section 23 transmits the request for transmission of the print data, to which the specific Cookie information is added, to the information processing apparatus 51. The specific Cookie information (i) is stored in the setting information database 6 and (ii) contains the domain name for identifying the external device (in this case, the information processing apparatus 51) that is designated by the instruction to acquire the print data. It follows that the control application section 23 obtains the print data from the external application section 54.

Since the external application section 54 obtains the session ID even from the request for data transmission which request is received from the apparatus control section 7 that is an HTTP client different from the web browser section 5, the external application section 54 can identify the user who caused the application to be executed. Therefore, it becomes possible to judge whether or not the request is authorized.

Further, the multifunction apparatus 21 transmits, to the information processing apparatus 51, the scanned data or the request for the print data, to which the specific Cookie information is added. Therefore, the information processing apparatus 51 can identify the user who caused the application to be executed, even if the communication between the multifunction apparatus 21 and the information processing apparatus 51 is disconnected or even if the user logs out during the transmission of the scanned data or the transmission of the request for the print data.

The following description deals with a concrete example of a process carried out in the cooperation mode of the multifunction apparatus control system 1 of the present embodiment.

CONCRETE EXAMPLE 1

Execution of Scanning Application

Figure 3:
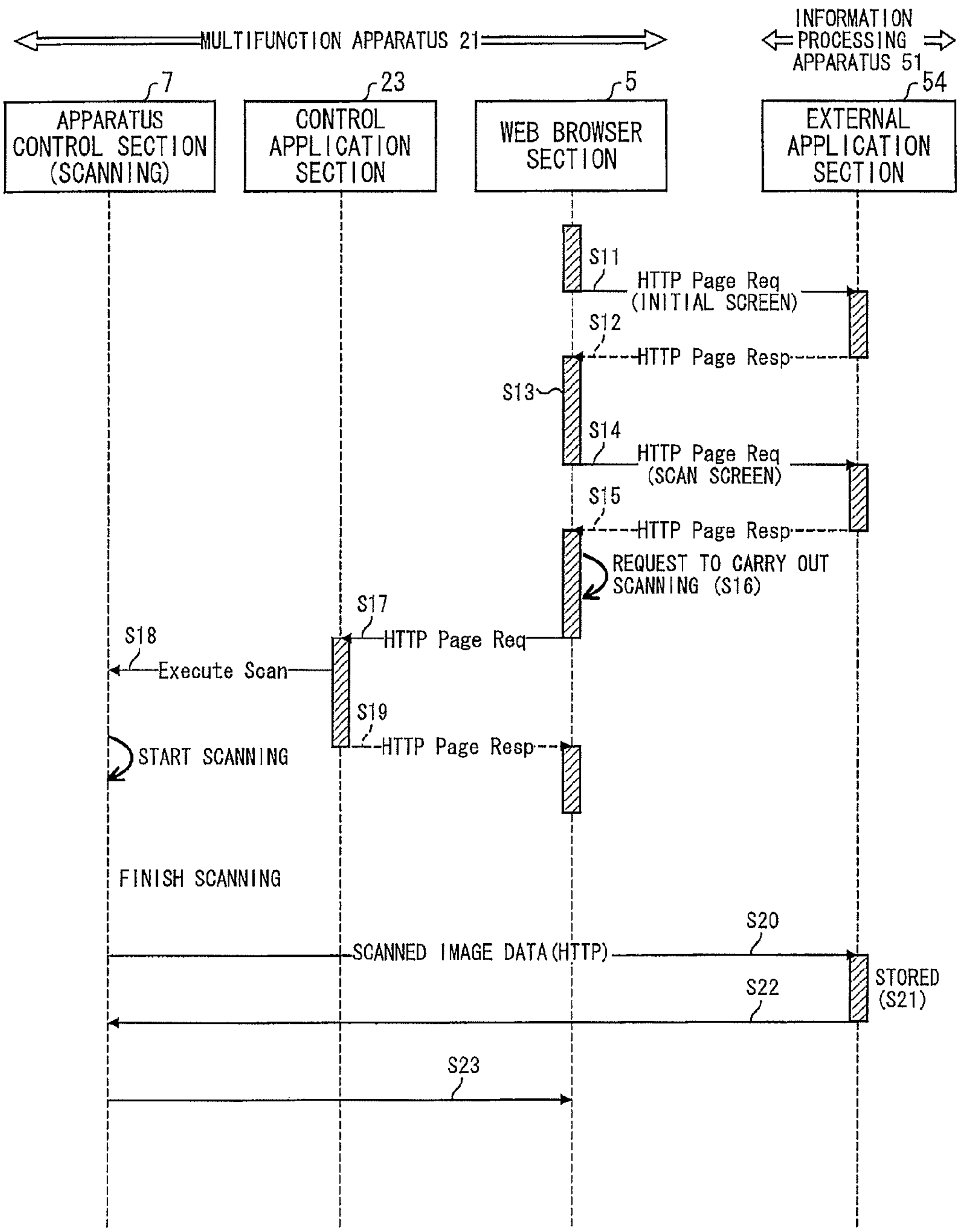
FIG. 3

First described is a process flow in a concrete example in which the multifunction apparatus 21 and the information processing apparatus 51 work together so as to cause the multifunction apparatus 21 to (i) display the operation screen and (ii) carry out the scanning. FIG. 3 is a view showing the process flow of the concrete example.

In a case where the input section 11 receives an instruction to start up the cooperation mode, the apparatus control section 7 causes the web browser section 5 to start up. Then, the web browser section 5 accesses the information processing apparatus 51 in accordance with an initial URL set in advance, and transmits an HTTP Get command which requests the transmission of data of an initial operation screen for document management (S11).

In response to the HTTP Get command transmitted in S11, the external application section 54 sends back, to the multifunction apparatus 21, HTML data which corresponds to the initial operation screen for the document management (S12). Then, the web browser section 5 of the multifunction apparatus 21 causes the display section 10 to display the initial operation screen on the basis of the HTML data (S13).

Figures 4, 5:
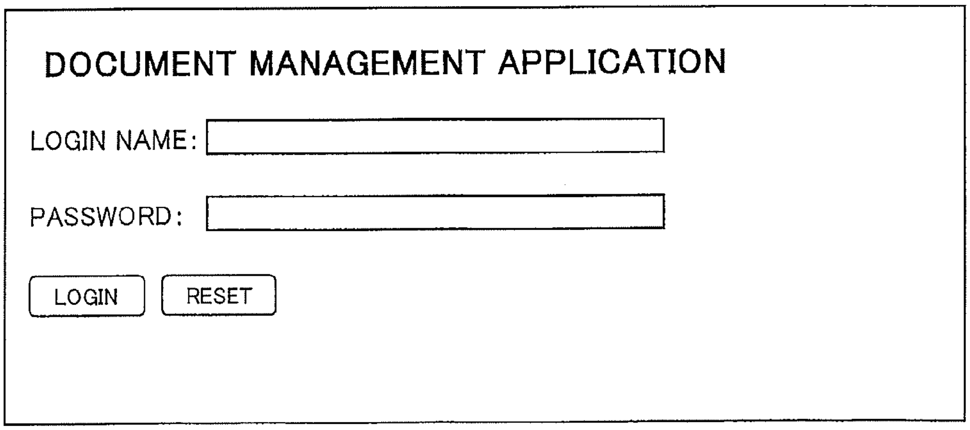
FIG. 4
FIG. 5

FIG. 4 is a view showing an example of the HTML data in which a screen definition of the initial operation screen is described, which HTML data is transmitted in S12. Further, FIG. 5 is a view showing an example of the initial operation screen of the HTML data shown in FIG. 4. In S13, the display section 10 displays the initial operation screen which urges the user to enter a login name and a password (see FIGS. 4 and 5).

In a case where (i) a login name and a password are entered via the initial operation screen and (ii) a "Login" button is pressed on the initial operation screen, the web browser section 5 proceeds to the next process on the basis of the HTML data received in S12. In a case where, for example, the multifunction apparatus 21 receives the HTML data shown in FIG. 4, the web browser section 5 transmits the entered authentication information (in this case, the login name and the password) to an URL: "http://123.123.123.123/app/auth", which is designated by an "action" attribute in an authentication "form" element. Here, the "123.123.123.123" stands for an IP address of the information processing apparatus 51, and the "app/auth" stands for an authentication application which operates on the external application section 54. In this case, in accordance with the URL, the web browser section 5 transmits, to the information processing apparatus 51 via the second communication section 22, (i) the HTTP request for transmission of data of an operation screen for a scanning function and (ii) the authentication information (S14).

The first web server section 53 of the information processing apparatus 51 instructs the external application section 54 to carry out a process of the authentication application in accordance with the HTTP request transmitted in S14. Then, the external application section 54 carries out, in accordance with the authentication application, the authentication process with respect to the authentication information received from the multifunction apparatus 21.

Specifically, the external application section 54 carries out a matching process between (i) the authentication information and (ii) a user name and a password which are registered in advance. In a case where the authentication information matches the user name and the password registered in advance, it is judged that the authentication was successful. In contrast, in a case where the authentication information does not match the user name and the password registered in advance, it is judged that the authentication was unsuccessful. In a case where the authentication was judged to be successful, the external application section 54 creates HTML data indicating the operation screen for carrying out the scanning function. Note, here, that the external application section 54 adds the Cookie information to the HTML data of the operation screen, in a case where the Cookie information is to be stored in the web browser section 5 in accordance with the input entered by the user. Specifically, the external application section 54 adds, as a part of the HTTP data, a Set-Cookie header to the HTTP data, and then transmits the HTTP data with the Set-Cookie header to the multifunction apparatus 21 (S15).

FIG. 6 is an example of the Set-Cookie header. In the Set-Cookie header, a name and its value, an expiration date, and an applicable scope (a domain name and a file path name) are described (see FIG. 6). Note that a well-known technique is applicable to the Set-Cookie header.

FIG. 7 is an example of the Cookie information. As illustrated in FIG. 7, the file of cookie information is made up of a pair of a name and value, and several parameters, which parameters are marked off by tabs. For example, in case of an example of a first line of the Cookie information shown in FIG. 7, a first column and a second column indicate the applicable scope. The ".example.com" in the first column is the domain name, and the "/" in the second column is the file path name. Note, here, that the domain name ".example.com" is a domain name of the information processing apparatus 51. The "1 May 2010 09:10:11 GMT" in a third column indicates the expiration date. The expiration date is set to 9:10:11 a.m. on May 1, 2010 in the example of FIG. 7. The "appsession" in a fourth column is a name of a key for identifying information that is caused to be stored by software on the web server. In the case of the first line of the Cookie information shown in FIG. 7, the "appsession" indicates that the Cookie information is a session ID. Lastly, the "leisyxineiduyen" in a fifth column indicates a value allocated to the key of the fourth column. In the first line of the Cookie information, the "leisyxineiduyen" indicates a specific session ID. Note here that the external application section 54 stores the issued Cookie information.

On the other hand, in the case where the authentication is judged to be unsuccessful, the external application section 54 creates HTML data indicating the operation screen which urges the user to enter the authentication information again. Then, the first web server section 53 transmits, as the HTTP response, the HTML data created by the external application section 54 to the multifunction apparatus 21 via the first communication section 52.

Then, upon the reception of the HTML data, the web browser section 5 of the multifunction apparatus 21 causes the display section 10 to display the operation screen corresponding to the HTML data. Further, the web browser section 5 stores the Cookie information in the setting information database 6, in a case where the Set-Cookie header shown in FIG. 6 is added to the HTML data to which the operation screen corresponds. Note that FIG. 3 shows a case where (i) the authentication was successful and (ii) the operation screen, via which the scanning function is carried out, is displayed.

FIG. 8 is a view showing an example of the HTML data in which a screen definition of the operation screen is described, which HTML data is transmitted in S15. Further, FIG. 9 is a view showing an example of the operation screen which is displayed in accordance with the HTML data shown in FIG. 8. In S16, the operation screen with a button for executing the scanning function is displayed (see FIGS. 8 and 9).

In the present concrete example, the "http://127.0.0.1/scan/execscan" is set as a next URL which is accessed by the multifunction apparatus 21, when the button for executing the scanning function is pressed (see FIG. 8). Note, here, that (i) the IP address: "127.0.0.1" is a loopback address and (ii) the "scan/execscan" contained in the URL indicates an instruction to carry out the scanning function by the scanning application.

The operation screen can have a button for setting a condition for the scanning. In this case, a URL, to which the condition for the scanning is added as query characters, should be set in the HTML data in advance. For example, the URL: "http://127.0.0.1/scan/execscan?color=mono&file=pdf" should be set with respect to a condition for the scanning, under which the scanning is carried out in a black-and-white mode so that the scanned data has an output file of PDF format. Note, here, that "?" and subsequent characters are the query characters. According to the query characters, (i) the "color=mono" requests that a color setting should be set to the black-and-white mode and (ii) the "file=pdf" requests that the scanned data should have an output file format of PDF. This also makes it possible to set the condition for the scanning.

FIG. 8 also shows an alternative method, in which there is a description of "input type='hidden'" which is not the one for displaying an object on the screen. The description indicates that information is added to a parameter, which is designated by the "action" attribute, when a scanning button which is defined as the "input type="submit"" is pressed. In this case, an HTTP request "http://127.0.0.1/scan/execscan?dest=http://www.example.com/docmng/receive" is issued. Here, the "dest" designates the destination of the scanned data by use of the domain information "www.example.com/docmng/receive". A scan parameter can be also described by such a description.

In a case where the button for carrying out the scanning is pressed on the operation screen shown in FIG. 9 (S16), the web browser section 5 accesses the second web server section 8 provided in the multifunction apparatus 21 in which the web browser section 5 is provided. This is because the IP address of the URL is set in advance as the loopback address. Then, the web browser section 5 informs the second web server section 8 of an HTTP request containing an instruction to carry out the scanning function by the scan application (S17).

The second web server section 8 causes the control application section 23 to carry out the process of the scan application in accordance with the HTTP request received from the web browser section 5. First, the control application section 23 obtains the Cookie information stored in the setting information database 6. In a case where there is the specific Cookie information which is identical with the "www.example.com/docmng/receive" which is the domain information of the destination of the scanned data, the control application section 23 (i) creates, at the time of the transmission of the scanned data, a control command for carrying out the scanning, to which control command the specific Cookie information is added and (ii) transmits the control command with the specific Cookie information to the apparatus control section 7 (S18). Note that, in a case where the HTTP request contains a condition for the scanning, the control application section 23 creates a control command for carrying out the scanning under the condition for the scanning.

Note that, in a case where there is no specific Cookie information that is identical with the domain information, the control application section 23 can create a control command for carrying out the scanning, to which control command no Cookie information is added, and then can continue the process or carry out an error process.

In a case where, for example, (i) the Cookie information shown in FIG. 7 is stored in the setting information database 6 and (ii) the domain information of the destination of the scanned data is "www.example.com/docmng/receive", the control application section 23 selects and determines, as the specific Cookie information to be added to the scanned data, a piece of the Cookie information in the first and second lines of the Cookie information of FIG. 7, whose domain names are "example.com".

Upon reception of a response (S19) to the HTTP request (S17) containing the instruction to carry out the scanning function from the control application section 23, the web browser section 5 causes the display section 10 to display a scanning start screen.

Then, the apparatus control section 7 controls the image scanning section 2 to carry out the scanning. Upon completion of the scanning, the apparatus control section 7 transmits the scanned data to a designated block. Here, it is assumed that the external application section 54 of the information processing apparatus 51 is designated. The apparatus control section 7 controls the second communication section 22 to transmit the scanned data to the external application section 54 of the information processing apparatus 51 (S20). The transmission of the scanned data is carried out via the HTTP communication, and the specific Cookie information which has been obtained earlier is added to the HTTP communication (HTTP request) as the HTTP header.

FIG. 10 is an example of the Cookie HTTP header. The data format shown in FIG. 10 is used in a case where the Cookie information is transmitted during a communication from the apparatus control section 7 to the information processing apparatus 51. Note that a well-known technique is applicable to the use of the Cookie HTTP header.

Then, the external application section 54 checks that the session ID of the specific Cookie information is appropriate, and then stores the received scanned data in the storage section (S21).

For example, the external application section 54 determines that the scanned data is received from an authenticated user, in a case where the session ID of the specific Cookie information received from the apparatus control section 7 is identical with the session ID of the Cookie information stored in S15. In this case, the external application section 54 stores the received scanned data in the storage section. In contrast, the external application section 54 determines that the scanned data is received from an unauthenticated user, in a case where the session ID of the specific Cookie information received from the apparatus control section 7 is not identical with the session ID of the Cookie information stored in S15. In this case, the external application section 54 does not store the received scanned data in the storage section. This allows prevention of the scanned data from being stored by an unauthenticated access.

Instead, in a case where the session ID of the specific Cookie information received from the apparatus control section 7 is identical with the session ID of the Cookie information stored in S15, the external application section 54 can store the received scanned data in the storage section so that the received scanned data is associated with information indicating a multifunction apparatus or a user (e.g. a user ID), which information is contained in the specific Cookie information. This allows a user to easily find user's scanned data out of the scanned data stored in the storage section of the information processing apparatus 51.

When the transmission of the scanned data is completed, the apparatus control section 7 receives, from the first web server section 53, an HTTP response indicating that the scanned data has been stored in the storage section (S22). Generally, in a case where the HTTP response contains a command to delete the specific Cookie information, it is possible to delete the specific Cookie information, which is transmitted from the control application section 23 to the apparatus control section 7 during the scanning, whereas it is impossible to delete the specific Cookie information stored in the web browser section 5. As a result, the specific Cookie information is left in the web browser section 5.

In this regard, according to the multifunction apparatus control system 1 of the present embodiment, in a case where the HTTP response to the transmission of the scanned data contains the command to delete the specific Cookie information, the apparatus control section 7 informs the control application section 23 of a request for deleting the specific Cookie information (S23). Then, the control application section 23 searches for the specific Cookie information stored in the setting information database 6 of the web browser section 5, and then deletes the specific Cookie information to be deleted from the setting information database 6. Note that the command to delete the specific Cookie information can be generally realized by setting, in the Set-Cookie header shown in FIG. 6, the expiration date for the specific Cookie information to a time before the current time.

As described above, according to the present Concrete Example 1, the web browser section 5 (i) transmits the HTTP request for the transmission of the operation screen to the first web server section 53 and (ii) receives, in response to the HTTP request, the HTTP response containing image data in which the loopback address is set as an address to be accessed when the instruction to carry out the scanning is entered via the operation screen. Then, the web browser section 5 causes the display section 10 to display the operation screen in accordance with the HTTP response. In a case where the instruction to carry out the scanning is entered via the display screen, the web browser section 5 accesses the second web server section 8, and then informs the second web server section 8 of the entered instruction to carry out the scanning. This allows the multifunction apparatus 21 to carry out the scanning.

Further, the external application section 54 adds the specific Cookie information to the HTTP response of the operation screen, and then transmits the HTTP response with the specific Cookie information to the multifunction apparatus 21. The apparatus control section 7 transmits the scanned data, to which the specific Cookie information is added, to the external application section 54. This allows the external application section 54 to obtain a session ID in response to a request for data transmission, received from the apparatus control section 7 which is an HTTP client different from the web browser section 5. It is therefore possible to easily identify the user on the basis of the specific Cookie information.

Note that timing, when the control application section 23 obtains the Cookie information which is stored in the setting information database 6, is not limited to the one in the present example described above. The control application section 23 can obtain the Cookie information stored in the setting information database 6, for example, at the timing when the web browser section 5 informs the second web server section 8 of the HTTP request while the apparatus control section 7 is monitoring a loopback call. This allows a reduction in processing time.

CONCRETE EXAMPLE 2

Execution of Printing Application

The present concrete example deals with a case where (i) print data to be printed is stored in advance in an information processing apparatus 51 and (ii) a user operates a multifunction apparatus 21 to carry out a printing process so as to print out the print data.

Figure 11:
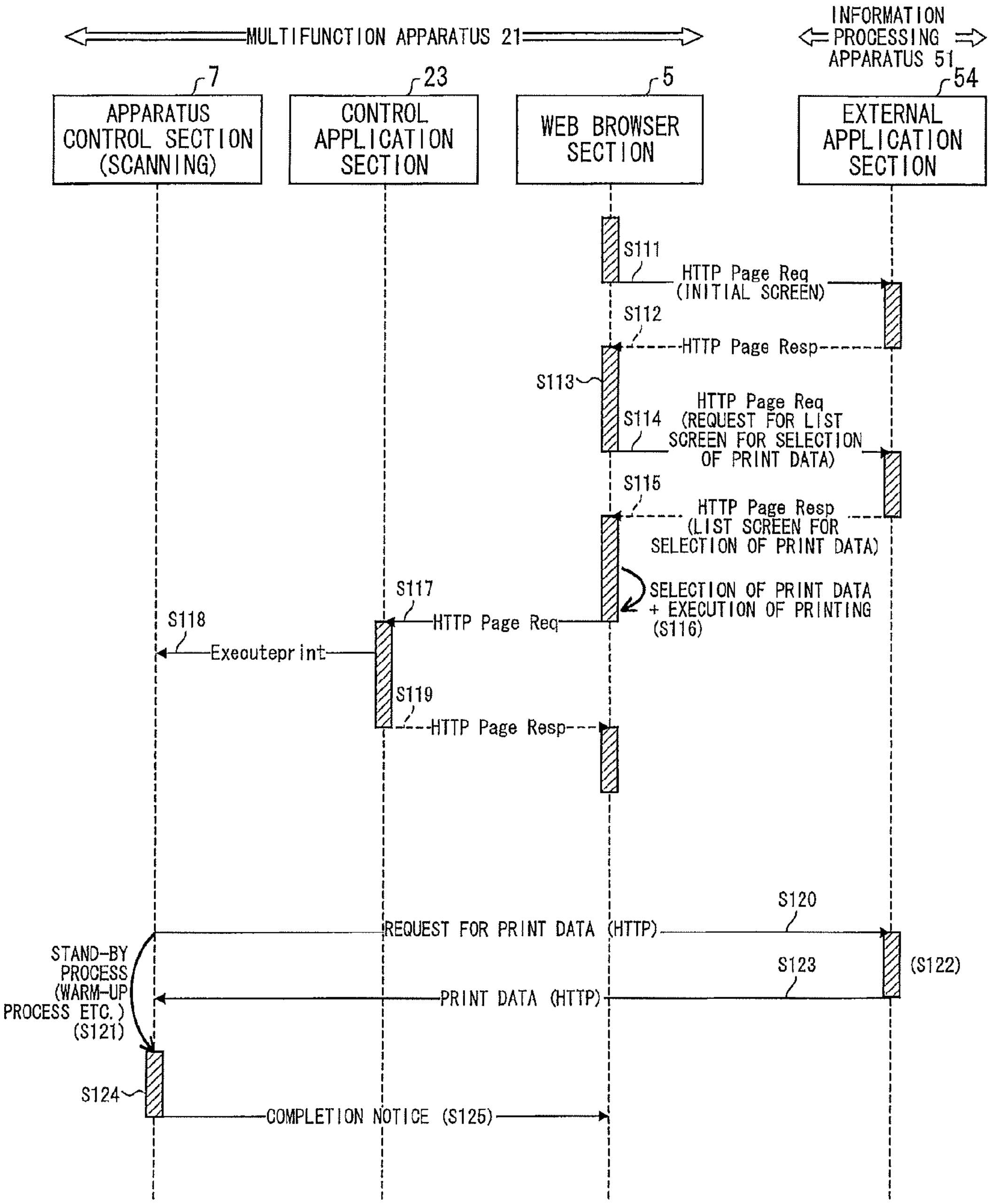
FIG. 11

The following description deals with a flow of the process of the present concrete example with reference to FIG. 11. Note that the user is assumed to store the print data in advance in a storage section of the information processing apparatus 51 before the process of the present concrete example is carried out. Note also that processes of S111 and S112 of the present concrete example are substantially identical with the processes of S11 and S12 shown in FIG. 3, respectively. Their descriptions are therefore omitted here.

First, a web browser section 5 of the multifunction apparatus 21 causes a display section 10 to display an initial operation screen (S113). The user enters an instruction to request an operation screen via which target print data is to be designated. In response to the user entering the instruction, the web browser section 5 transmits, to the information processing apparatus 51, an HTTP request for the operation screen (image data selection screen) via which the target print data is to be designated (S114).

An external application section 54 of the information processing apparatus 51 creates, in accordance with the HTTP request received in S114, an HTML data indicating the image data selection screen. Here, in a case where Cookie information is to be stored in the web browser section 5 on the basis of the instruction entered by the user, the external application section 54 adds the Cookie information to the HTML data of the image data selection screen. Specifically, the external application section 54 transmits the HTML data, to which a Set-Cookie header shown in FIG. 6 is added as a part of the HTML data, to the multifunction apparatus 21 (S115). Note, here, that the external application section 54 stores the issued Cookie information.

Then, upon reception of the HTML data, the web browser section 5 of the multifunction apparatus 21 causes the display section 10 to display, on the basis of the received HTML data, the image data selection screen via which the target print data is to be designated. In a case where the Set-Cookie header is contained in the HTML data of the image data selection screen, the web browser section 5 stores the Cookie information in the setting information database 6 in accordance with the instruction. The user enters, via the image data selection screen, (i) a name of a folder in which image data (also called "print data" or "specific image data") to be printed is stored and (ii) a name of a file of the print data. Then, the user presses a button for carrying out a printing function (S116).

In a case where the button for carrying out the printing is pressed, the web browser section 5 accesses the second web server section 8 provided in the multifunction apparatus 21 in which the web browser section 5 is provided. This is because an IP address of an URL is set as a loopback address. Then, the web browser section 5 informs the second web server section 8 of an HTTP request containing an instruction to carry out the printing function by a printing application (S117).

The second web server section 8 causes, in accordance with the HTTP request received from the web browser section 5, the control application section 23 to carry out a process of the printing application. First, the control application section 23 obtains the Cookie information stored in the setting information database 6. In a case where there is specific Cookie information which is identical with domain information of a data source from which the print data is obtained, the control application section 23 (i) creates a control command to add the specific Cookie information to a request for transmission of the print data, and (ii) transmits the request, to which the specific Cookie information is added, to a apparatus control section 7 (S118). Note that in a case where the HTTP request contains a condition for the printing, the control application section 23 creates a control command to carry out the printing under the condition for the printing. Further, upon reception of a response (S119) to the HTTP request containing the instruction to carry out the printing function from the control application section 23 (S117), the web browser section 5 causes the display section 10 to display a screen for starting the printing.

Then, the apparatus control section 7 carries out the printing process in accordance with the control command. Specifically, the apparatus control section 7 transmits, to the information processing apparatus 51, an HTTP Get command which requests transmission of the print data (S120). The request for the transmission of the print data is transmitted via HTTP communication. Here, the specific Cookie information which has been obtained earlier is added to the HTTP response as an HTTP header. The apparatus control section 7 simultaneously starts carrying out a stand-by process (S121).

When a first web server section 53 of the information processing apparatus 51 receives the HTTP command transmitted in S120, the external application section 54 analyzes the Get command so as to check that a session ID of the specific Cookie information is appropriate. Then, the external application section 54 reads out the requested print data from the storage section (S122). The first web server section 53 transmits the print data, which is read out from the external application section 54, to the apparatus control section 7 (S123).

For example, in a case where the session ID of the specific Cookie information added to the Get command is identical with the session ID of the Cookie information stored in S115, the external application section 54 determines that the request is received from an authenticated user. In this case, the external application section 54 sends back the print data to the multifunction apparatus 21. In contrast, in a case where the session ID of the specific Cookie information added to the Get command is not identical with the session ID of the Cookie information stored in S115, the external application section 54 determines that the request is received from an unauthenticated user. In this case, the external application section 54 does not send back the print data to the multifunction apparatus 21. This allows prevention of data from being stored by an unauthenticated access.

Then, the apparatus control section 7 carries out the printing process so as to print out the print data (S124). Specifically, the apparatus control section 7 transmits the print data to an image forming section 3, and then controls the image forming section 3 to form an image indicated by the print data on a sheet.

When the printing process is finished, the apparatus control section 7 transmits a notice of termination to the control application section 23. In response to the notice of termination, the control application section 23 (i) changes, by use of an HTTP redirect, an access destination to the first web server section 53 of the information processing apparatus 51 and (ii) transmits, to the web browser section 5, an HTTP response which requests a termination screen (S125).

According to the present Concrete Example 2, the web browser section 5 causes the display section 10 to display the image data selection screen via which the target print data is specified, as described above. Further, in a case where the specific information (the name of the folder and the name of the file) for specifying the target print data is entered via the image data selection screen, the web browser section 5 determines that an instruction to print an image on the basis of the print data (specific image data) indicated by the specific information is entered as a control instruction. Then, the web browser section 5 transmits, to the first web server section 53, the HTTM request containing the request for the print data indicated by the specific information. In response to the HTTP request, the first web server section 53 sends back, to the web browser section 5, the HTTP response containing (i) the instruction to change, by use of the HTTP redirect, the access destination to the second web server section 8, (ii) the print data indicated by the specific information, and (iii) the instruction to print the image indicated by the print data. Because of this, the web browser section 5 can inform the second web server section 8 of (i) the print data and (ii) the instruction to print the image indicated by the print data, by accessing the second web server section 8 in accordance with the HTTP response. Therefore, the apparatus control section 7 can control the image forming section 3 to print the image indicated by the print data on the sheet of recording paper in accordance with (i) the print data and (ii) the instruction to print the image indicated by the print data, of which the second web server section 8 has been informed by the web browser section 5.

Further, the external application section 54 adds the Cookie information to the HTTP response of the image data selection screen, and then transmits the HTTP response with the Cookie information to the multifunction apparatus 21. The apparatus control section 7 transmits, to the external application section 54, an HTTP Get command (i) which requests transmission of the print data and (ii) to which the Cookie information (specific Cookie information) is added. This allows the external application section 54 to (i) obtain session information from the request for data transmission, received from the apparatus control section 7 which is an HTTP client different from the web browser section 5, and (ii) identify the appropriate session ID.

MODIFIED EXAMPLE 1

The foregoing descriptions of the present embodiment deal with the case where control application section 23 (i) obtains the Cookie information stored in the web browser section 5 and (ii) creates the control command in which the Cookie information is added to the HTTP request for data transmission. Note, however, that the present embodiment is not limited to this. For example, the Cookie information may be contained in the HTTP communication from the web browser section 5 to the second web server section 8 so that the web browser section 5 informs the control application section 23 of the Cookie information. That is, the Cookie information is transmitted from the web browser section 5 to the control application section 23 via the second web server section 8.

According to a general method for using Cookie information, (i) the Cookie information contains a domain name of a web server communicating with a web browser section 5, and (ii) in a case where the domain name is identical with that of Cookie information stored in a destination communicating with the web browser section 5, the web browser section 5 informs, of the Cookie information, a destination having such a domain name. In other words, Cookie information which is stored in accordance with a request received from an external application section 54 is not transmitted to a control application section 23 whose domain is different from that of the external application section 54.

For example, the external application section 54 which has caused the Cookie information to be stored operates with a domain name of ".example.com". Since a domain of the control application section 23 is identical with that of the multifunction apparatus 21 (e.g. "127.0.0.1"), the web browser section 5 determines that the domain of the web browser section 5 is different from that of the control application section 23. Therefore, the web browser section 5 cannot inform the control application section 23 of the Cookie information containing the ".example.com".

Note, however, that it has been well known that the external application section 54 can designate the domain name of the destination to which the Cookie information is transmitted. Therefore, in a case where the external application section 54 causes the Cookie information to be stored in the web browser section 5 in such a manner that the external application section 54 allows the Cookie information to be transmitted to the control application section 23, the web browser section 5 can inform the control application section 23 of the Cookie information by an instruction received from the external application section 54.

According to the technique, however, the external application section 54 has to carry out (i) setting of the Cookie information which allows transmission to the domain name of the external application section 54, and (ii) setting of the Cookie information which allows transmission to the domain name of the multifunction apparatus 21 (control application section 23). This increases a burden in development of the external application section 54. Further, information to be stored in a setting information database 6 of the web browser section 5 is doubled in data amount. This is not preferable, particularly, in a case where the setting information database 6 has a limitation in capacity of memory for storing the Cookie information. Furthermore, as the number of pieces of the Cookie information is increased, another problem is generated, such as an increase in amount of data transmitted between the web browser section 5 and the external application section 54.

In order to solve the problems described above, the web browser section 5 can be arranged to inform a second web server section 8 of the Cookie information stored in the web browser section 5 when the web browser section 5 carries out the HTTP communication with the second web server section 8. As described above, according to the multifunction apparatus control system 1, the external application section 54 can change, by use of the HTTP redirect, the access destination to the second web server section 8. That is, in a case where the destination of the access is the loopback address, the destination of the access would be the second web server section 8 provided in the multifunction apparatus 21 in which the web browser section 5 is provided. Therefore, the web browser section 5 can inform the second web server section 8 of the Cookie information stored in the web browser section 5.

For this reason, according to the multifunction apparatus control system 1, it is possible to add the Cookie information to the HTTP communication from the web browser section 5 to the second web server section 8 without suffering from the foregoing problems. Note that the Cookie information is transmitted to only the designated domain so as to prevent leakage of information. In this regard, however, since both the web browser section 5 and the second web server section 8 operate in the multifunction apparatus 21, the information transmitted between them never leaks.

In this case, it is preferable that the Cookie information transmitted from the web browser section 5 to the second web server section 8 via the HTTP communication is limited to Cookie information having a domain identical with that of the first web server section 53 which sets the second web server section 8 as a source of a HTTP communication request. With this arrangement, in a case where, for example, the external application section 54 which has transmitted a response of the HTML data shown in FIG. 8 operates with the domain name of ".example.com", the Cookie information transmitted from the web browser section 5 to the second web server section 8 would be the one having the identical domain name of ".example.com" at the second column in the first line (in the example of the Cookie file shown in FIG. 7). Note, however, that in a case where the web browser section 5 informs the second web server section 8 of the Cookie information via the HTTP communication, the web browser section 5 informs the second web server section 8 of not only a pair of a name and a value shown in FIG. 10 but also the domain name of the source of the Cookie information shown in FIG. 6. This is because it is necessary for the control application section 8 which has obtained Cookie information to check whether or not the domain of the obtained Cookie information is identical with the destination to which the image data is transmitted. Note that in a case where the domain set in the Cookie information is different from the destination to which the image data is transmitted, the control application section 8 does not transmit the Cookie information.

As described above, the Cookie information at the second column in the first line shown in FIG. 7 can be transmitted, by use of the Cookie file in the data format shown in FIG. 6, from the web browser section 5 to the second web server section 8. As described above, it is also possible to realize the multifunction apparatus control system 1 by arranging such that the Cookie information is transmitted from the web browser section 5 to the control application section 23 via the second web server section 8.

MODIFIED EXAMPLE 2

The foregoing Modified Example 1 deals with the arrangement in which the apparatus control section 7 adds the specific Cookie information to the generated scanned data, and transmits the scanned data, to which the specific Cookie information is added, to the information processing apparatus 51. Note, here, that the multifunction apparatus 21 can temporarily store the generated scanned data so that the scanned data and the Cookie information are associated with each other.

Specifically, a multifunction apparatus 21 further includes an image data storage section for storing scanned data, and a apparatus control section 7 causes the image data storage section to store the generated scanned data so that the scanned data and specific Cookie information are associated with each other. In this case, it is preferable that the apparatus control section 7 deletes the scanned data associated with the specific Cookie information from the image data storage section when an expiration date of the specific Cookie information is reached. This makes it possible to automatically delete the scanned data when the expiration date of the specific Cookie information is reached. Further, since the expiration date of the specific Cookie information can be set by the external application section 54, it is possible to collectively manage, on the information processing apparatus 51, scanned data stored in the multifunction apparatus 21.

MODIFIED EXAMPLE 3

The foregoing Modified Example 2 deals with the arrangement in which when the request for acquisition of the print data, to which the specific Cookie information is added, is received from the multifunction apparatus 21, the external application section 54 (i) checks whether or not the specific Cookie information is appropriate, and then (ii) reads out the requested print data from the storage section in a case where the external application section 54 determines that the specific Cookie information is appropriate, after that (iii) transmits the print data to the apparatus control section 7. Note, here, that the external application section 54 can be arranged to store the specific Cookie information so that the specific Cookie information and the print data are associated with each other. In this case, it is preferable that the external application section 54 deletes the print data associated with the specific Cookie information from the storage section when an expiration date of the specific Cookie information is reached.

This causes a time period in which the user can make a re-access by use of the Cookie information to be identical with a time period in which the print data is stored in the storage section. Therefore, it becomes possible to easily manage the print data stored in the information processing apparatus 51.

Note that the Cookie information can be set per application. Therefore, in each of Modified Examples 2 and 3, the external application section 54 can set, in accordance with the application, the Cookie information so that the Cookie information includes such a request that when the expiration date of the Cookie information is reached, the image data associated with the Cookie information is deleted. Specifically, in accordance with the application, the external application section 54 causes the Cookie information to contain an execution possible/impossible command which indicates whether or not the image data is to be deleted. Then, in the case of Modified Example 2, the apparatus control section 7 (i) checks the execution possible/impossible command contained in the Cookie information when the expiration date of the Cookie information is reached, and (ii) deletes the image data only in a case where the execution possible/impossible command indicates "possible". In the case of Modified Example 3, the external application section 54 also carries out a similar process.

This makes it possible to easily manage the image data stored in the multifunction apparatus control system 1. In the foregoing descriptions of the present embodiment, the multifunction apparatus 21 includes the second web server section 8. Note, however, that the present invention is not limited to the arrangement. In the multifunction apparatus 21, the second web server section 8 functions as an intermediate section via which the web browser section 5 transmits the control instruction received from the first web server section 53 of the information processing apparatus 51 to the apparatus control section 7. That is, the arrangement employing the second web server section 8 is merely one embodiment in which the apparatus control section 7 does not have to receive the control instruction from the first web server section 53 of the information processing apparatus 51. The web server section 8 may be replaced with another intermediate member.

[Conclusion of Embodiment]

A multifunction apparatus of the present embodiment, which communicates with an information processing apparatus via a communication network, the information processing apparatus including a first web server section which operates in accordance with software of a web server, includes: a web browser section which operates in accordance with software of a web browser; a second web server section which operates in accordance with the software of the web server; a storage section for storing Cookie information transmitted from the first web server section to the web browser section; and a control section, the web browser section (i) receiving, from the first web server section, control information for informing the second web server section of a control instruction to control the multifunction apparatus, and (ii) informing the second web server section of the control instruction upon reception of the control information from the first web server section, the control section controlling the multifunction apparatus in accordance with the control instruction received by the second web server section, the control section (i) determining, as specific Cookie information, Cookie information that (a) is stored in the storage section, and (b) contains identification information for identifying an external device which is designated, by the instruction to transmit the image data, as a destination to which the image data is transmitted, and (ii) transmitting the image data, to which the specific Cookie information is added, to the external device which is designated as the destination to which the image data is transmitted, in a case where the control instruction is an instruction to transmit image data.

According to the arrangement, the control section can receive the control instruction from the second web server section of the multifunction apparatus, instead of receiving the control instruction from the first web server section of the information processing apparatus. Since the control section and the second web server section are provided in the same multifunction apparatus, no firewall occurs between the control section and the second web server section.

Further, in the case where the control instruction is the instruction to transmit the image data, the control section (i) determines, as the specific Cookie information, the Cookie information that (a) is stored in the storage section, and (b) contains identification information for identifying the external device which is designated, by the instruction to transmit the image data, as the destination to which the image data is transmitted, and (ii) transmits the image data, to which the specific Cookie information is added, to the external device designated as the destination to which the image data is transmitted.

Therefore, in a case where the external device designated as the destination to which the image data is transmitted is the information processing apparatus, the specific Cookie information added to the image data is identical with the Cookie information which is received by the web browser section when the web browser section receives the control information from the first web server section. Accordingly, by checking the specific Cookie information added to the image data, the first web server section of the information processing apparatus can easily determine whether or not the access is authenticated, more specifically, whether or not the image data is transmitted from the authenticated user who has communicated with the first web server section via the web browser section.

Further, a multifunction apparatus of the present embodiment, which communicates with an information processing apparatus via a communication network, the information processing apparatus including a first web server section which operates in accordance with software of a web server, includes: a web browser section which operates in accordance with software of a web browser; a second web server section which operates in accordance with the software of the web server; a storage section for storing Cookie information transmitted from the first web server section to the web browser section; and a control section, the web browser section (i) receiving, from the first web server section, control information for informing the second web server section of a control instruction to control the multifunction apparatus, and (ii) informing the second web server section of the control instruction upon reception of the control information from the first web server section, the control section controlling the multifunction apparatus in accordance with the control instruction transmitted to the second web server section, the control section (i) determining, as specific Cookie information, Cookie information that (a) is stored in the storage section, and (b) contains identification information for identifying an external device which is designated as a data source of image data by the instruction to acquire the image data, and (ii) transmitting a request to transmit the image data, to which request the specific Cookie information is added, to the external device which is designated as the data source of the image data, in a case where the control instruction is an instruction to acquire image data from an external device.

According to the arrangement, in the case where the control instruction is the instruction to acquire the image data from the external device, the control section (i) determines, as the specific Cookie information, the Cookie information that (a) is stored in the storage section, and (b) contains the identification information for identifying the external device which is designated as the data source of the image data by the instruction to acquire the image data, and (ii) transmits the request to transmit the image data, to which request the specific Cookie information is added, to the external device which is designated as the data source of the image data.

Therefore, in a case where the external device which is designated as the data source of the image data is the information processing apparatus, the specific Cookie information added to the request to transmit the image data is identical with the Cookie information received by the web browser section when the web browser section receives the control information from the first web server section. Accordingly, by checking the specific Cookie information added to the request to transmit the image data, the first web server section of the information processing apparatus can easily determine whether or not the access is authenticated, more specifically, whether or not the request is made by the authenticated user who has communicated with the first web server section via the web browser section.

Furthermore, in the multifunction apparatus of the present embodiment, the control section preferably reads out the specific Cookie information from the storage section.

According to the arrangement, the control section can obtain the specific Cookie information by accessing the storage section. This allows the control section to obtain the Cookie information without an increase in amount of data transmitted between the web browser section and the second web server section.

Moreover, in the multifunction apparatus of the present embodiment, (I) the external device may serve as the information processing apparatus, (II) the web browser section may inform the second web server of Cookie information that (i) is stored in the storage section and (ii) contains identification information for identifying the first web server section, and (III) the control section may obtain the specific Cookie information out of the Cookie information which is informed by the second web server section.

According to the arrangement, the web browser section can inform the second web server section of the Cookie information stored in the storage section. For this reason, the control section does not have to access the web browser section to obtain the specific Cookie information.

This can reduce a burden of the control section and simplify the arrangement of the control section.

Further, in the multifunction apparatus of the present embodiment, the control section preferably deletes the specific Cookie information from the storage section when receiving, from the external device, a request to delete the specific Cookie information.

According to the arrangement, it is possible to cause the control section and the storage section to be in sync with each other in management of the specific Cookie information.

Furthermore, the multifunction apparatus of the present embodiment preferably further includes an image data storage section for storing the image data so that the image data and the specific Cookie information are associated with each other, the control section deleting, from the image data storage section, the image data associated with the specific Cookie information, when an expiration date of the specific Cookie information is reached.

According to the arrangement, the control section deletes the image data stored in the storage section when the expiration date of the specific Cookie information is reached. Further, the expiration date of the specific Cookie information can be set on the information processing apparatus.

This makes it possible to collectively manage, on the information processing apparatus, the image data stored in the multifunction apparatus.

Moreover, in the multifunction apparatus of the present embodiment, the specific Cookie information preferably contains a request to delete the image data associated with the specific Cookie information when the expiration date of the specific Cookie information is reached.

According to the arrangement, in the case where the specific Cookie information contains the request, the control section deletes the image data.

By causing the Cookie information to contain the request as described above, it becomes possible to easily manage the image data in the multifunction apparatus.

A multifunction apparatus control system of the present embodiment includes: an information processing apparatus including a first web server section which operates in accordance with software of a web server; and a plurality of multifunction apparatuses each of which communicates with the information processing apparatus via a communication network, each of the plurality of multifunction apparatuses including: a web browser section which operates in accordance with software of a web browser; a second web server section which operates in accordance with the software of the web server; a storage section for storing Cookie information transmitted from the first web server section to the web browser section; and a control section, the web browser section (i) receiving, from the first web server section, control information for informing the second web server section of a control instruction to control the multifunction apparatus, and (ii) informing the second web server section of the control instruction upon reception of the control information from the first web server section, the control section controlling the multifunction apparatus on the basis of the control instruction transmitted to the second web server section, the control section (i) determining, as specific Cookie information, Cookie information that (a) is stored in the storage section and (b) contains identification information for identifying the first web server section which is designated, by the instruction to transmit the image data, as a destination to which the image data is transmitted, and (ii) transmitting the image data, to which the specific Cookie information is added, to the first web server section, in a case where the control instruction is an instruction to transmit image data.

According to the arrangement, by checking the specific Cookie information added to the image data, the first web server section can easily determine whether or not the access is authenticated, more specifically, whether or not the image data is transmitted from the authenticated user who has communicated with the first web server section via the web browser section.

Further, in the multifunction apparatus control system of the present embodiment, the first web server section preferably (i) receives the image data to which the specific Cookie information is added, and (ii) stores the image data in a case where the specific Cookie information is identical with the Cookie information transmitted to the web browser section.

According to the arrangement, the image data is stored in the case where the access is confirmed as being authenticated by the fact that the specific Cookie information is identical with the Cookie information received by the web browser section. Therefore, it becomes possible to prevent the image data from being stored by an unauthenticated access.

Furthermore, in the multifunction apparatus control system of the present embodiment, the first web server section preferably (i) receives the image data to which the specific Cookie information is added, and (ii) in a case where the specific Cookie information is identical with the Cookie information transmitted to the web browser section, stores the image data and client information for identifying (I) a multifunction apparatus indicated by the specific Cookie information or (II) a user indicated by the specific Cookie information so that the image data and the client information are associated with each other.

According to the arrangement, the client information and the image data are stored so that they are associated with each other. Therefore, the user can easily find the image data corresponding to the user's operation among the image data stored in the information processing apparatus.

A multifunction apparatus control system of the present embodiment includes: an information processing apparatus including a first web server section which operates in accordance with software of a web server; and a plurality of multifunction apparatuses each of which communicates with the information processing apparatus via a communication network, each of the plurality of multifunction apparatuses including: a web browser section which operates in accordance with software of a web browser; a second web server section which operates in accordance with the software of the web server; a storage section for storing Cookie information transmitted from the first web server section to the web browser section; and a control section, the web browser section (i) receiving, from the first web server section, control information for informing the second web server section of a control instruction to control the multifunction apparatus, and (ii) informing the second web server section of the control instruction upon reception of the control information from the first web server section, the control section controlling the multifunction apparatus on the basis of the control instruction transmitted to the second web server section, the control section (i) determining, as specific Cookie information, Cookie information that (a) is stored in the storage section and (b) contains identification information for identifying the first web server section which is designated, by the instruction to acquire the image data, as a data source of the image data, and (ii) transmitting a request to transmit the image data, to which request the specific Cookie information is added, to the first web server section, in a case where the control instruction is an instruction to acquire image data from the first web server section, the first web server transmitting the image data to the control section in a case where the specific Cookie information added to the request is identical with the Cookie information transmitted to the web browser section.

According to the arrangement, by checking the specific Cookie information added to the request, the first web server section can easily determine whether or not the access is authenticated, more specifically, whether or not the request is transmitted from the authenticated user who has communicated with the first web server section via the web browser section.

Further, in the multifunction apparatus control system of the present embodiment, upon reception of a request to transmit the image data, to which the specific Cookie information is added, the first web server section preferably stores the specific Cookie information and the image data so that the specific Cookie information and the image data are associated with each other, and the first web server section preferably deletes the image data associated with the specific Cookie information at timing when an expiration date of the specific Cookie information is reached.

According to the arrangement, the first web server section deletes the image data when the expiration date of the specific Cookie information is reached. Therefore, the image data is automatically deleted when a time period in which a re-access can be made expires (the expiration date is reached).

This allows the user to cause, by use of the specific Cookie information, the time period in which the re-access can be made to be identical with a time period in which the image data is stored. Accordingly, it becomes possible to easily manage the image data stored in the information processing apparatus.

Moreover, in the multifunction apparatus control system of the present embodiment, the specific Cookie information preferably contains a request to delete the image data associated with the specific Cookie information when the expiration date of the specific Cookie information is reached.

According to the arrangement, in the case where the specific Cookie information contains the request, the first web server section deletes the image data.

By causing the Cookie information to contain the request as described above, it becomes possible to easily manage the image data in the multifunction apparatus control system.

Note that the multifunction apparatus described above can be realized by a computer. In this case, the scope of the present invention encompass: a program for realizing the multifunction apparatus on a computer by causing the computer to function as each of the sections described above; and a computer-readable storage medium in which the program is stored.

The present invention is not limited to the description of the embodiments above, but may be altered by a skilled person within the scope of the claims. An embodiment based on a proper combination of technical means disclosed in different embodiments is encompassed in the technical scope of the present invention.

Lastly, each of the blocks of the multifunction apparatus 21 and the information processing apparatus 51 can be realized by a hardware logic or by software by use of a CPU (Central Processing Unit) as described below.

That is, each of the multifunction apparatus 21 and the information processing apparatus 51 includes: the CPU (central processing unit) which executes an instruction of a control program realizing each of the functions described above; a ROM (read only memory) in which the program is stored; a RAM (random access memory) which develops the program; a storage device (storage medium), such as a memory, in which the program and various kinds of data are stored; and the like. Further, the object of the present invention can be achieved in the following manner: (i) a storage medium for computer-readably storing a program code (an execute form program, intermediate code program, or source program) of the control program of the apparatus control section 7, which is software for implementing the aforementioned functions, is provided to the multifunction apparatus 21 and the information processing apparatus 51, and (ii) a computer (or a CPU or a MPU (Microprocessor Unit)) of each of the multifunction apparatus 21 and the information processing apparatus 51 reads out the program code stored in the storage medium so as to execute the program.

Examples of the storage medium encompass: tapes, such as magnetic tapes and cassette tapes; disks including magnetic disks, such as floppy disks (registered trademark) and hard disks, and optical disks, such as CD-ROMs (Compact Disc Read-Only Memories), MOs (Magnetic Optical Disks), MDs (mini disks), DVDs (digital video disks), and CD-Rs (CD Recordable); cards, such as IC cards (including memory cards) and optical cards; and semiconductor memories, such as mask ROMs, EPROMs (Erasable Programmable Read-Only Memory), EEPROMs (Electrically Erasable and Programmable Read-Only Memory), and flash ROMs.

Further, each of the multifunction apparatus 21 and the information processing apparatus 51 can be made connectable to a communication network, and the program code can be supplied via the communication network. The communication networks are not limited to specific means. Examples of the communication network encompass the Internet, an intranet, an extranet, a LAN (Local Area Network), an ISDN (Integrated Services Digital Network), a VAN (Value-Added Network), a CATV (Community Antenna Television) communication network, a virtual private network, a telephone line network, a mobile communication network, a satellite communication network, and the like. Furthermore, a transmission medium constituting the communication network is not particularly limited. Specifically, it is possible to use a wired line such as a line in compliance with an IEEE (Institute of Electrical and Electronic Engineers) 1394 standard, a USB line, a power line, a cable TV line, a telephone line, an ADSL (Asynchronous Digital Subscriber Loop) line, and the like, as the transmission medium. Moreover, it is possible to use (i) a wireless line utilizing an infrared ray used in IrDA (Infrared Data Association) and a remote controller, (ii) a wireless line which is in compliance with a Bluetooth standard (registered trademark) or an IEEE802.11 wireless standard, and (iii) a wireless line utilizing an HDR (High Data Rate), a mobile phone network, a satellite line, a terrestrial digital network, and the like, as the transmission medium. Note that, the present invention can be realized by a computer data signal which is realized by electronic transmission of the program code and which is embedded in a carrier wave.

INDUSTRIAL APPLICABILITY

The present invention is applicable to a multifunction apparatus which realizes a plurality of functions such as transferring, scanning, and faxing.

REFERENCE SIGNS LIST

1: Multifunction apparatus control system
2: Image scanning section
3: Image forming section
4: Operational section
5. Web browser section
6: Setting information database
7: Apparatus control section (control section)
8: Second web server section
10: Display section
11: Input section
21: Multifunction apparatus

22: Second communication section
23: Control application section (control section)
50: Communication network
51: Information processing apparatus
52: First communication section
53: First web server section
54: External application section (first web server section)
71: Open I/F section

The invention claimed is:

1. A multifunction apparatus, which communicates with an information processing apparatus via a communication network, the information processing apparatus including a first web server section which operates in accordance with software of a web server, comprising:

a web browser section which operates in accordance with software of a web browser, the web browser section receiving, from the first web server section, (i) Cookie information and (ii) control information that informs a control instruction to control the multifunction apparatus;

a storage section that stores the Cookie information;

a control section that controls the multifunction apparatus in accordance with the control instruction when the web browser section receives the control instruction from the first web server section; and a second web server section which operates in accordance with the software of the web server, in a case where the control instruction is an instruction to transmit image data, the control section (i) determining, as specific Cookie information, Cookie information that (a) is stored in the storage section and (b) contains identification information that identifies an external device which is designated, by the instruction to transmit the image data, as a destination to which the image data is transmitted and (ii) transmitting the image data, to which the specific Cookie information is added, to the external device which is designated as the destination to which the image data is transmitted, the web browser section informing the second web server section of the control instruction, when the web browser section receives the control instruction from the first web server section, and the control section controlling the multifunction apparatus in accordance with the control instruction transmitted from the web browser section to the second web server section.

2. The multifunction apparatus as set forth in claim 1, wherein:

the control section reads out the specific Cookie information from the storage section.

3. The multifunction apparatus as set forth in claim 1, wherein:

the external device also serves as the information processing apparatus;

the web browser section informs the second web server of Cookie information that (i) is stored in the storage section and (ii) contains identification information that identifies the first web server section; and the control section obtains the specific Cookie information out of the Cookie information which is informed by the second web server section.

4. The multifunction apparatus as set forth in claim 1, wherein:

the control section deletes the specific Cookie information from the storage section when receiving, from the external device, a request to delete the specific Cookie information.

5. The multifunction apparatus as set forth in claim 1, further comprising:

an image data storage section that stores the image data so that the image data and the specific Cookie information are associated with each other, the control section deleting, from the image data storage section, the image data associated with the specific Cookie information, when an expiration date of the specific Cookie information is reached.

6. The multifunction apparatus as set forth in claim 5, wherein:

the specific Cookie information contains a request to delete the image data associated with the specific Cookie information when the expiration date of the specific Cookie information is reached.

7. A multifunction apparatus, which communicates with an information processing apparatus via a communication network, the information processing apparatus including a first web server section which operates in accordance with software of a web server, comprising:

a web browser section which operates in accordance with software of a web browser, the web browser section receiving, from the first web server section, (i) Cookie information and (ii) control information that informs a control instruction to control the multifunction apparatus;

a storage section that stores the Cookie information;

a control section that controls the multifunction apparatus in accordance with the control instruction when the web browser section receives the control instruction from the first web server section; and a second web server section which operates in accordance with the software of the web server, in a case where the control instruction is an instruction to acquire image data from an external device, the control section (i) determining, as specific Cookie information, Cookie information that (a) is stored in the storage section and (b) contains identification information that identifies an external device which is designated, by the instruction to acquire image data, as a source of the image data and (ii) transmitting a request that transmits the image data, to which the specific Cookie information is added, to the external device which is designated as the source of the image data so as to acquire the image data from the external device, the web browser section informing the second web server section of the control instruction, when the web browser section receives the control instruction from the first web server section, and the control section controlling the multifunction apparatus in accordance with the control instruction transmitted from the web browser section to the second web server section.

8. The multifunction apparatus as set forth in claim 7, wherein:

the control section reads out the specific Cookie information from the storage section.

9. The multifunction apparatus as set forth in claim 7, wherein:

the external device also serves as the information processing apparatus;

the web browser section informs the second web server of Cookie information that (i) is stored in the storage section and (ii) contains identification information that identifies the first web server section; and the control section obtains the specific Cookie information out of the Cookie information which is informed by the second web server section.

10. The multifunction apparatus as set forth in claim 7, wherein:

the control section deletes the specific Cookie information from the storage section when receiving, from the external device, a request to delete the specific Cookie information.

11. A multifunction apparatus control system comprising:

an information processing apparatus including a first web server section which operates in accordance with software of a web server; and a plurality of multifunction apparatuses each of which communicates with the information processing apparatus via a communication network, said each of the plurality of multifunction apparatuses including:

a web browser section which operates in accordance with software of a web browser, the web browser section receiving, from the first web server section, (i) Cookie information and (ii) control information that informs a control instruction to control the multifunction apparatus;

a storage section that stores the Cookie information; and a control section that controls the multifunction apparatus in accordance with the control instruction when the web browser section receives the control instruction from the first web server section, in a case where the control instruction is an instruction to transmit image data, the control section (i) determining, as specific Cookie information, Cookie information that (a) is stored in the storage section and (b) contains identification information that identifies the first web server section which is designated, by the instruction to transmit the image data, as a destination to which the image data is transmitted, and (ii) transmitting the image data, to which the specific Cookie information is added, to the first web server section; wherein said each of the plurality of multifunction apparatuses further includes a second web server section which operates in accordance with the software of the web server;

the web browser section informs the second web server section of the control instruction, when the web browser section receives the control instruction from the first web server section; and the control section controls the multifunction apparatus in accordance with the control instruction transmitted from the web browser section to the second web server section.

12. The multifunction apparatus control system as set forth in claim 11, wherein:

the first web server section (i) receives the image data to which the specific Cookie information is added and (ii) stores the image data in a case where the specific Cookie information is identical with said Cookie information transmitted to the web browser section.

13. The multifunction apparatus control system as set forth in claim 11, wherein:

the first web server section (i) receives the image data to which the specific Cookie information is added and (ii) stores the image data so that the image data is associated with client information that identifies (a) a multifunction apparatus which indicated by the specific Cookie information or (b) a user, which is indicated by the specific Cookie information, in a case where the specific Cookie information is identical with said Cookie information transmitted to the web browser section.

14. A multifunction apparatus control system comprising:

an information processing apparatus including a first web server section which operates in accordance with software of a web server; and a plurality of multifunction apparatuses each of which communicates with the information processing apparatus via a communication network, said each of the plurality of multifunction apparatuses including:

a web browser section which operates in accordance with software of a web browser, the web browser section receiving, from the first web server section, (i) Cookie information and (ii) control information that informs a control instruction to control the multifunction apparatus;

a storage section that stores the Cookie information; and a control section that controls the multifunction apparatus in accordance with the control instruction when the web browser section receives the control instruction from the first web server section, in a case where the control instruction is an instruction to acquire image data from the first web server section, the control section (i) determining, as specific Cookie information, Cookie information that (a) is stored in the storage section and (b) contains identification information that identifies the first web server section which is designated, by the instruction to acquire the image data, as a data source of the image data, and (ii) transmitting a request to transmit the image data, to which the specific Cookie information is added, to the first web server section, the first web server section transmitting the image data to the control section in response to the request to transmit the image data, in a case where the specific Cookie information added to the request is identical with said Cookie information transmitted to the web browser section; wherein said each of the plurality of multifunction apparatuses further includes a second web server section which operates in accordance with the software of the web server;

the web browser section informs the second web server section of the control instruction, when the web browser section receives the control instruction from the first web server section; and the control section controls the multifunction apparatus in accordance with the control instruction transmitted from the web browser section to the second web server section.

15. The multifunction apparatus control system as set forth in claim 14, wherein:

upon reception of a request to transmit the image data, to which the specific Cookie information is added, the first web server section stores the specific Cookie information so that the specific Cookie information and the image data are associated with each other; and the first web server section deletes the image data associated with the specific Cookie information when an expiration date of the specific Cookie information is reached.

16. The multifunction apparatus control system as set forth in claim 15, wherein:

the specific Cookie information contains a request to delete the image data associated with the specific Cookie information when the expiration date of the specific Cookie information is reached.

17. A non-transitory computer-readable storage medium in which a program is stored, the program causing a computer to function as each of said sections of a multifunction apparatus as set forth in claim 1.

18. A non-transitory computer-readable storage medium in which a program is stored, the program causing a computer to function as each of said sections of a multifunction apparatus as set forth in claim 7.

* * * * *